US012567215B2

(12) United States Patent
Shirakawa

(10) Patent No.: US 12,567,215 B2
(45) Date of Patent: Mar. 3, 2026

(54) SYSTEM AND METHOD OF CONTROLLING SYSTEM

(71) Applicant: CANON KABUSHIKI KAISHA, Tokyo (JP)

(72) Inventor: Yuki Shirakawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 297 days.

(21) Appl. No.: 18/141,516

(22) Filed: May 1, 2023

(65) Prior Publication Data

US 2023/0377284 A1 Nov. 23, 2023

(30) Foreign Application Priority Data

May 19, 2022 (JP) ................................. 2022-082653

(51) Int. Cl.
| | |
|---|---|
| *G06T 19/00* | (2011.01) |
| *G02B 27/01* | (2006.01) |
| *G06V 10/44* | (2022.01) |

(52) U.S. Cl.
CPC ........ *G06T 19/006* (2013.01); *G02B 27/0172* (2013.01); *G06V 10/44* (2022.01); *G06T 2219/024* (2013.01)

(58) Field of Classification Search
None
See application file for complete search history.

(56) References Cited

U.S. PATENT DOCUMENTS

| | | | |
|---|---|---|---|
| 2005/0027871 A1 | 2/2005 | Bradely et al. | |
| 2012/0210254 A1 | 8/2012 | Fukuchi et al. | |
| 2013/0073632 A1 | 3/2013 | Fedorov et al. | |
| 2020/0336309 A1 * | 10/2020 | Wang ..................... | G06F 21/31 |
| 2021/0158213 A1 | 5/2021 | Shirakawa | |
| 2021/0314525 A1 * | 10/2021 | Raduchel ........... | H04N 21/2187 |
| 2022/0237844 A1 * | 7/2022 | Yabe ....................... | A63F 13/35 |

FOREIGN PATENT DOCUMENTS

| | | |
|---|---|---|
| JP | 2007-526526 A | 9/2007 |
| JP | 2014-528133 A | 10/2014 |
| JP | 2014-235717 A | 12/2014 |
| JP | 2015-072607 A | 4/2015 |
| WO | 2013/108549 A | 7/2013 |

OTHER PUBLICATIONS

Jan. 6, 2026 Office Action in Japanese Patent Application No. 2022-082653 (with English translation).

* cited by examiner

*Primary Examiner* — Nicholas R Wilson
(74) *Attorney, Agent, or Firm* — Venable LLP

(57) ABSTRACT

A system that manages a virtual object to perform: acquiring data associated with display of the virtual object in each terminal based on information which is provided from a service for managing a feature quantity in the real world for displaying the virtual object in association with the real world in correlation with identification information from one or more terminals; and providing information on the virtual object acquired based on the acquired data.

12 Claims, 14 Drawing Sheets

Figure 2:
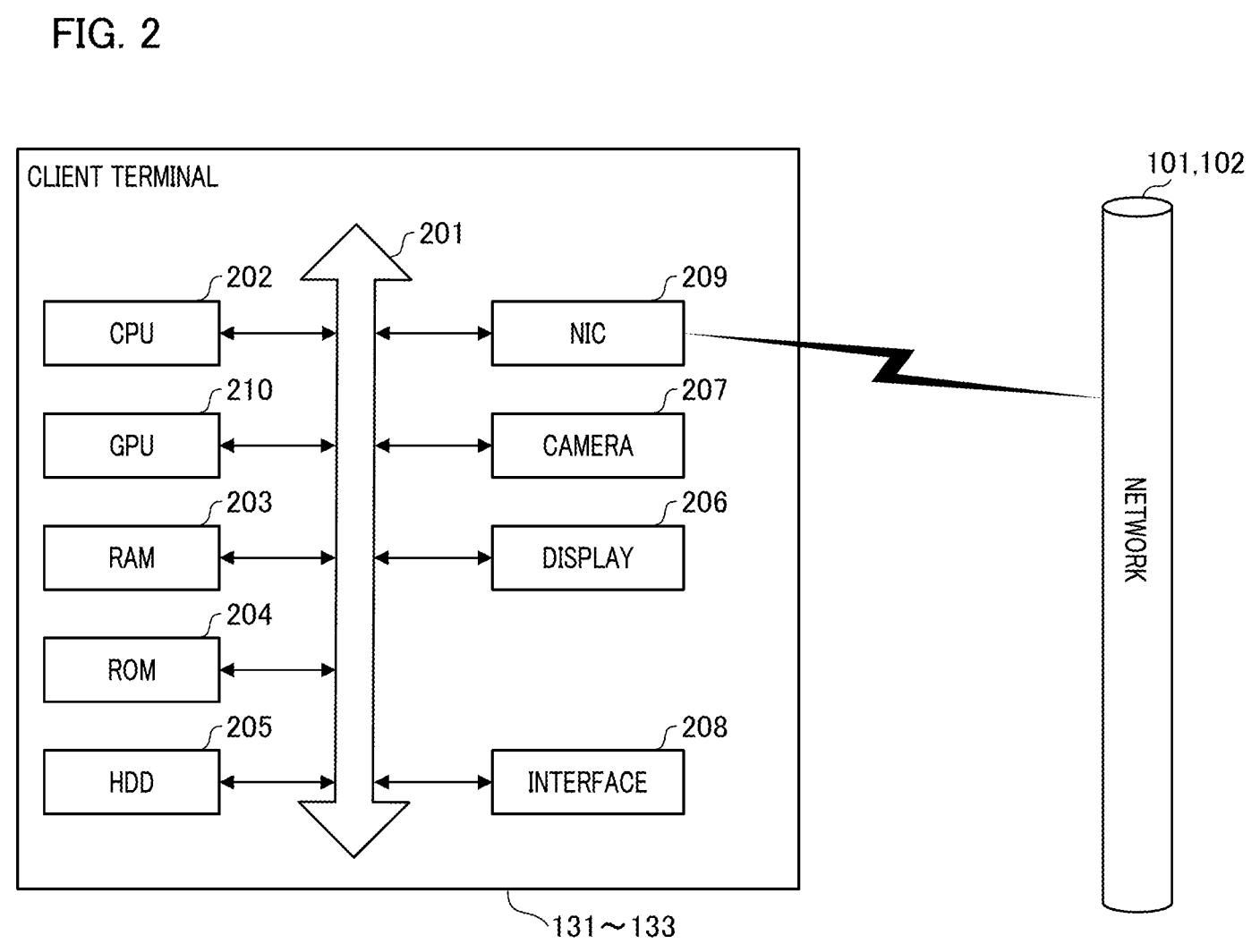

NETWORK

CLIENT TERMINAL

209 NIC

207 CAMERA

206 DISPLAY

208 INTERFACE

131~133

201

202 CPU

210 GPU

203 RAM

204 ROM

205 HDD

FIG. 14A
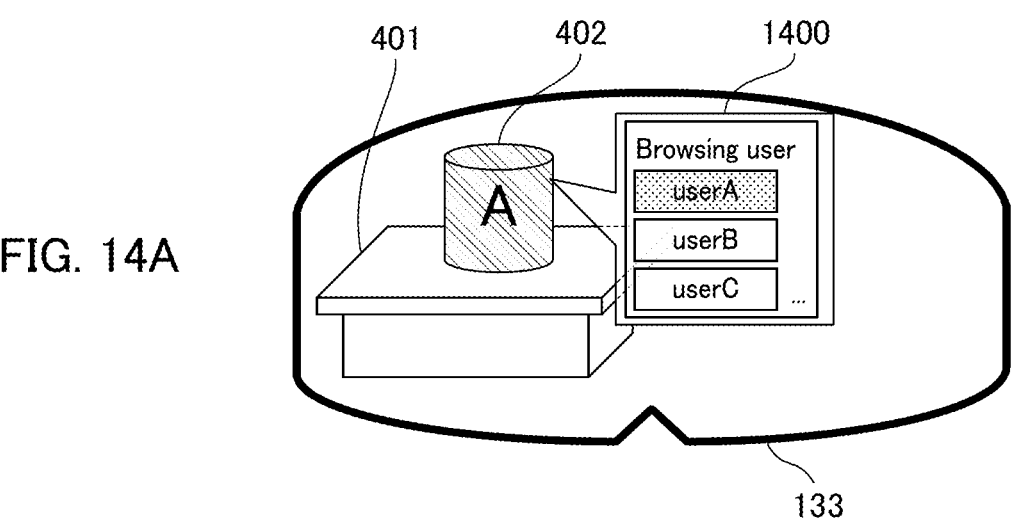
FIG. 14B
FIG. 14C
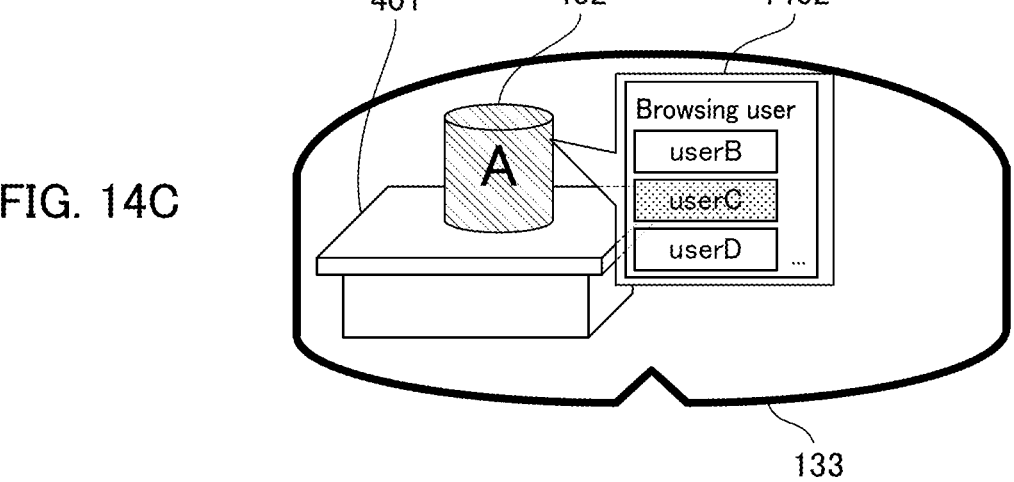

SYSTEM AND METHOD OF CONTROLLING SYSTEM

BACKGROUND OF THE INVENTION

Field of the Invention

The present invention relates to a system that controls a virtual object.

Description of the Related Art

Technology of generating a space in which a simulated experience is provided by combining the real world and a virtual world such as virtual reality (VR), augmented reality (AR), and mixed reality (MR) has attracted attention. XR is a generic term thereof. Recently, a structure for displaying one virtual object at the same place in the real world using a plurality of terminals has been realized on platforms that are provided by various companies. For example, there is a cloud system that manages a virtual object to be disposed in the real world and feature quantities of the real world ascertained using a camera or the like in correlation. By ascertaining the real world matching the feature quantities managed by the cloud system using a camera of an arbitrary terminal, the arbitrary terminal can allow a virtual object managed in correlation with the feature quantities to be viewed. A virtual object can be shared by a plurality of users in the same space. Japanese Unexamined Patent Application Publication No. 2015-72607 discloses an information processing device that displays identification information for identifying a sharing user who is set such that the user is permitted to access a virtual object in the vicinity of the sharing user on a screen. In Japanese Unexamined Patent Application Publication No. 2015-72607, a sharing user who is permitted to access a virtual object is identified according to the user's authority to access the virtual object.

However, in the technique disclosed in Japanese Unexamined Patent Application Publication No. 2015-72607, a user who can access a virtual object can be ascertained, but since the virtual object is not present in the real space, it is difficult to ascertain which user actually views the virtual object. For example, when feature points in the real world are not successfully recognized using a terminal of a user who is provided with a virtual object for sharing, the virtual object is not actually able to be viewed. In a conference or school work using AR, it is conceivable that a user who provides a virtual object for sharing want to ascertain whether the virtual object is correctly visible to a user who is provided with the virtual object for sharing. In an exhibition, an event, or the like, there is demand for ascertaining information indicating what virtual objects are actually often being viewed by users who have an authority to enter the place and to view the virtual object.

SUMMARY OF THE INVENTION

The present invention provides a system that can ascertain an actual browsing state of a shared virtual object.

According to an aspect of the present invention, there is provided a system that manages a virtual object, the system including: a memory storing instructions; and a processor executing the instructions causing the system to: acquire data associated with display of the virtual object in each of terminals based on information which is provided from a service for managing a feature quantity in the real world for displaying the virtual object in association with the real world in correlation with identification information from one or more terminals; and provide information on the virtual object acquired based on the acquired data.

Further features of the present invention will become apparent from the following description of exemplary embodiments with reference to the attached drawings.

BRIEF DESCRIPTION OF THE DRAWINGS

FIG. 2 is a diagram illustrating a hardware configuration of a client terminal.

FIGS. 14A to 14C are diagrams illustrating an example of display of a browsing state of a virtual object according to a third embodiment.

DESCRIPTION OF THE EMBODIMENTS

First Embodiment

Figure 1:
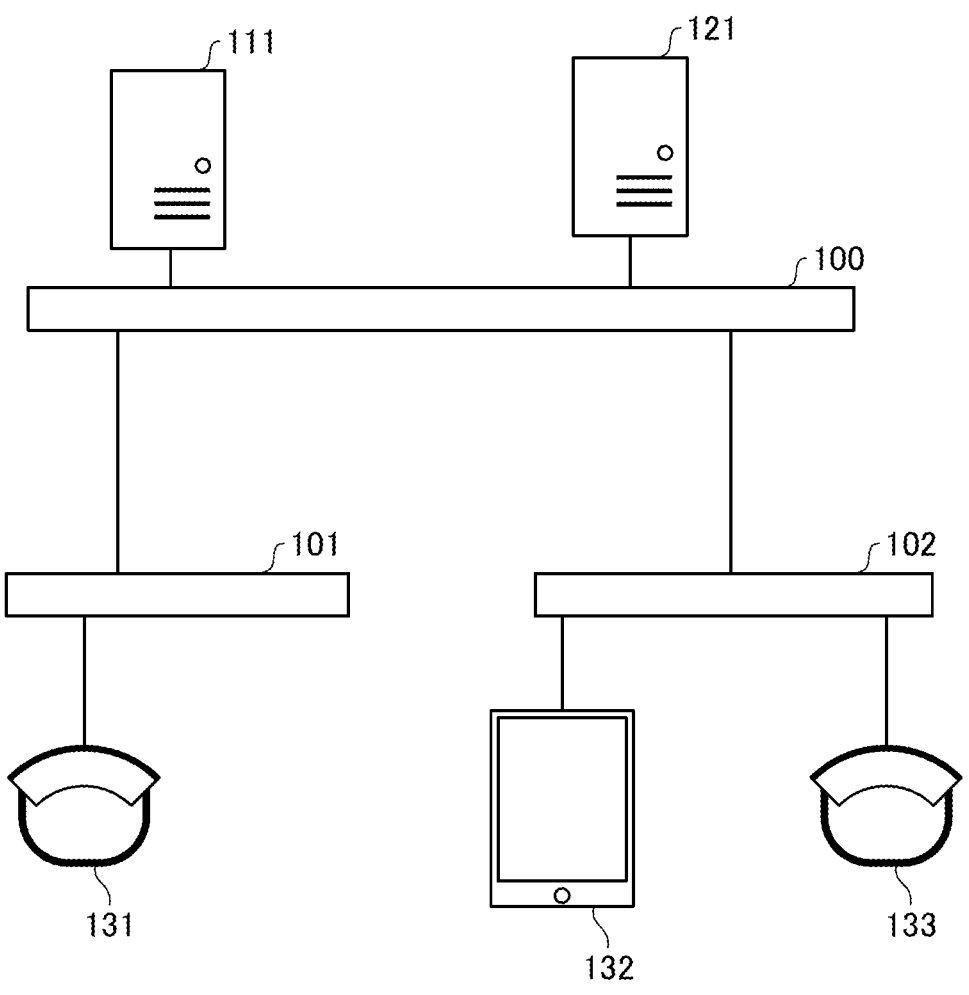
FIG. 1 is a diagram illustrating a configuration of a virtual object management system.

FIG. 1 is a diagram illustrating an entire configuration of a system that manages a virtual object. A virtual object management system includes a virtual object management server 111 that provides a virtual object, a statistic server 121, and a client terminal that can project the virtual object provided from the virtual object management server 111 onto the real world. In this embodiment, an example in which client terminals 131 to 133 are connected as the client terminal to the virtual object management server 111 will be described below.

The virtual object management server 111 and the statistic server 121 are connected to each other via a network 100. The client terminal 131 is connected to the virtual object management server 111 and the statistic server 121 via the network 100 and a network 101. The client terminal 132 and the client terminal 133 are connected to the virtual object management server 111 and the statistic server 121 via the network 100 and a network 102. The network 100 is the Internet, and the networks 101 and 102 are the Internet, a network in an ordinary home, a company, or a school, a wireless LAN setup in towns, or the like. The networks 100 to 102 may be a so-called communication network such as the Internet which is realized by a LAN, a WAN, a telephone line, a dedicated digital line, an ATM or a frame relay line, a cable television line, a data broadcast wireless line, or the like. The networks 100 to 102 have only to enable transmission and reception of data.

The client terminals 131 to 133 are terminals that can perform imaging of the real world, display of a virtual object, and communication with the virtual object management server 111 in order to project a virtual object onto the real world. The client terminals 131 to 133 are, for example, dedicated hardware corresponding to display of a virtual object which is handled in XR such as a head-mounted display (HMD) or smart glasses or a communication device into which an execution environment of a program is incorporated such as a smartphone. When the client terminals 131 to 133 are not dedicated hardware corresponding to display of a virtual object such as a smartphone, the client terminals 131 to 133 perform display of a virtual object using an API that is provided by a web browser, an OS, or the like. The client terminals 131 to 133 include a camera that images the surroundings and a display that displays a virtual object. The client terminals 131 to 133 provide a simulated experience in which the real world and a virtual world are combined to a user by imaging the surroundings using the camera or the like and displaying a virtual object on the real world imaged using the camera on the display through projection.

The virtual object management server 111 manages a feature quantity in the real world for displaying a virtual object in association with the real world in correlation with identification information and provides a service for providing a virtual object to an external terminal. The virtual object management server 111 is constructed, for example, using a server computer. In this embodiment, a virtual object provision service is provided by the virtual object management server 111, but the present invention is not limited thereto. Services or functions which are provided by the virtual object management server 111 may be realized by one or more information processing devices, a virtual machine (a cloud service) using resources provided by a data center including the information processing device, or a combination thereof.

The virtual object management server 111 manages a virtual object disposed in the real world and a feature quantity in the real world ascertained using a camera or the like in correlation as a part of the virtual object provision service. In this embodiment, a virtual object managed by the virtual object management server 111 and a feature quantity in the real world ascertained using a camera or the like are correlated and managed using an anchor. The anchor includes an identifier for identifying the anchor or a session ID in addition to a virtual object and a feature quantity in the real world for displaying the virtual object in association with the real world. In the anchor, at least three pieces of information including a feature quantity, position information, and sensor information in Table 2 which will be described later are managed as the feature quantities for displaying a virtual object in association with the real world. The virtual object management server 111 receives an anchor registration request from the client terminals 131 to 133 and manages the registered anchor. The virtual object management server 111 returns an anchor matching conditions out of anchors managed therein in response to an anchor acquisition request from the client terminals 131 to 133. The virtual object management server 111 also manages user information of users who use the client terminals 131 to

133. The virtual object management server 111 receives a login/logout request of users from the client terminals 131 to 133 and performs a login/logout process.

The statistic server 121 is a server that provides a service for ascertaining and providing a browsing state of a virtual object. The statistic server 121 acquires a browsing state of a virtual object from one or more client terminals and manages the browsing state of the virtual object for each user. In this embodiment, an example in which the service of managing a browsing state of a virtual object is provided by the statistic server 121 is described, but the present invention is not limited thereto. Services or functions provided by the statistic server 121 may be realized by one or more information processing devices, a virtual machine (a cloud service) using resources provided by a data center including the information processing device, or a combination thereof. The functions of the virtual object management server 111 and the statistic server 121 may be realized by a single server.

FIG. 2 is a diagram illustrating a hardware configuration of the client terminals 131 to 133. The client terminals 131 to 133 each include a CPU 202, a GPU 210, a RAM 203, a ROM 204, an HDD 205, a NIC 209, a camera 207, a display 206, and an interface 208. These are connected to a system bus 201.

The CPU (Central Processing unit) 202 controls the whole terminal. The GPU (Graphics Processing Unit) 210 performs an arithmetic process required for displaying a virtual object in real time. The RAM (Random Access Memory) 203 is a temporary storage means and serves as a main memory, a work area, and the like of the CPU 202 and the GPU 210. The ROM (Read Only Memory) 204 is a memory dedicated for reading data and stores various types of data such as a basic I/O program. The HDD (Hard Disk Drive) 205 is a large-capacity memory and stores an application program such as a web browser, an operating system (OS), relevant programs, various types of data, and the like. The HDD 205 is an example of a storage device and may be a memory such as a solid state drive (SSD) or an external storage device. The CPU 202 comprehensively controls the constituent units connected to the system bus 201 by loading a program stored in the memory (the ROM 204 or the HDD 205) to the RAM 203 and executing the loaded program.

The display 206 is a display means that displays a virtual object or information or the like required for operations. When a client terminal is a smartphone, a tablet, or the like, the display 206 may be a touch panel in which the display means and an input means are unified. By correlating input coordinates and display coordinates in the touch panel with each other, a GUI can be constructed as if a user were able to directly operate a screen displayed on the touch panel.

The camera 207 is an out-camera that captures an image of the surroundings, an in-camera that mainly captures an own image, or the like. By analyzing an image captured by the camera 207 using an application program stored in the HDD 205, it is possible to dispose a virtual object to overlap the real world and to calculate a feature quantity of the real world. When the client terminals 131 to 133 are dedicated terminals dedicated for XR such as an HMD, a virtual object displayed on the display 206 can also be operated by a user finger's operation recognized by the camera 207. When the client terminals 131 to 133 are not dedicated terminals dedicated for XR such as a smartphone, a virtual object displayed on the display 206 can be operated by operating the touch panel or the like of the display 206.

The NIC (Network Interface Card) 209 is a network interface that performs transmission and reception of data with an external device such as the virtual object management server 111 via the networks 101 and 102. The interface 208 is an interface with an external device and connects peripherals such as various external sensors. The configuration illustrated in FIG. 2 is an example, and the configuration of the client terminals 131 to 133 is not limited thereto. For example, a storage destination of data or programs may be changed to the ROM 204, the RAM 203, the HDD 205, and the like according to features thereof.

Figure 3:
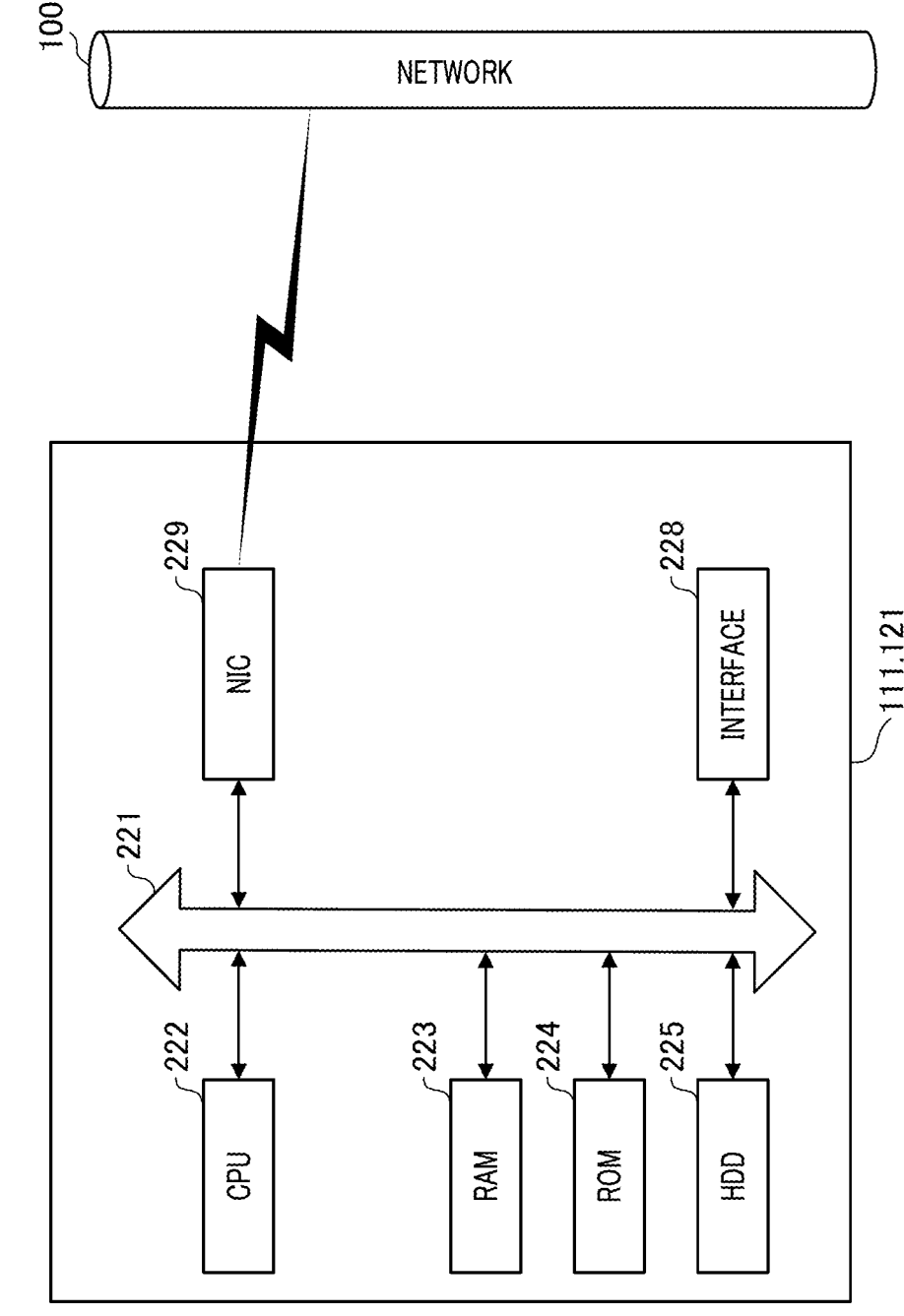
FIG. 3 is a diagram illustrating a hardware configuration of a virtual object management server.

FIG. 3 is a diagram illustrating a hardware configuration of the virtual object management server 111 and the statistic server 121. The virtual object management server 111 and the statistic server 121 each include a CPU 222, a RAM 223, a ROM 224, an HDD 225, a NIC 229, and an interface 228. These are connected to a system bus 221. The CPU 222 controls the virtual object management server 111. The RAM 223 is a temporary storage means and serves as a main memory, a work area, and the like of the CPU 222. The ROM 224 is a memory dedicated for reading data and stores various types of data such as a basic I/O program. The HDD 225 is a large-capacity memory and stores programs of a service server group, an operating system (OS), relevant programs, various types of data, and the like. The CPU 222 comprehensively controls the constituent units connected to the system bus 221 by loading a program stored in the memory (the ROM 224 or the HDD 225) to the RAM 223 and executing the loaded program.

The NIC 229 is a network interface that performs transmission and reception of data with an external device such as the client terminals 131 to 133 and another server via the network 100. The interface 228 is an interface with an external device and connects peripherals. The configuration illustrated in FIG. 3 is an example, and the configuration of the virtual object management server 111 and the statistic server 121 is not limited thereto.

Figure 4:
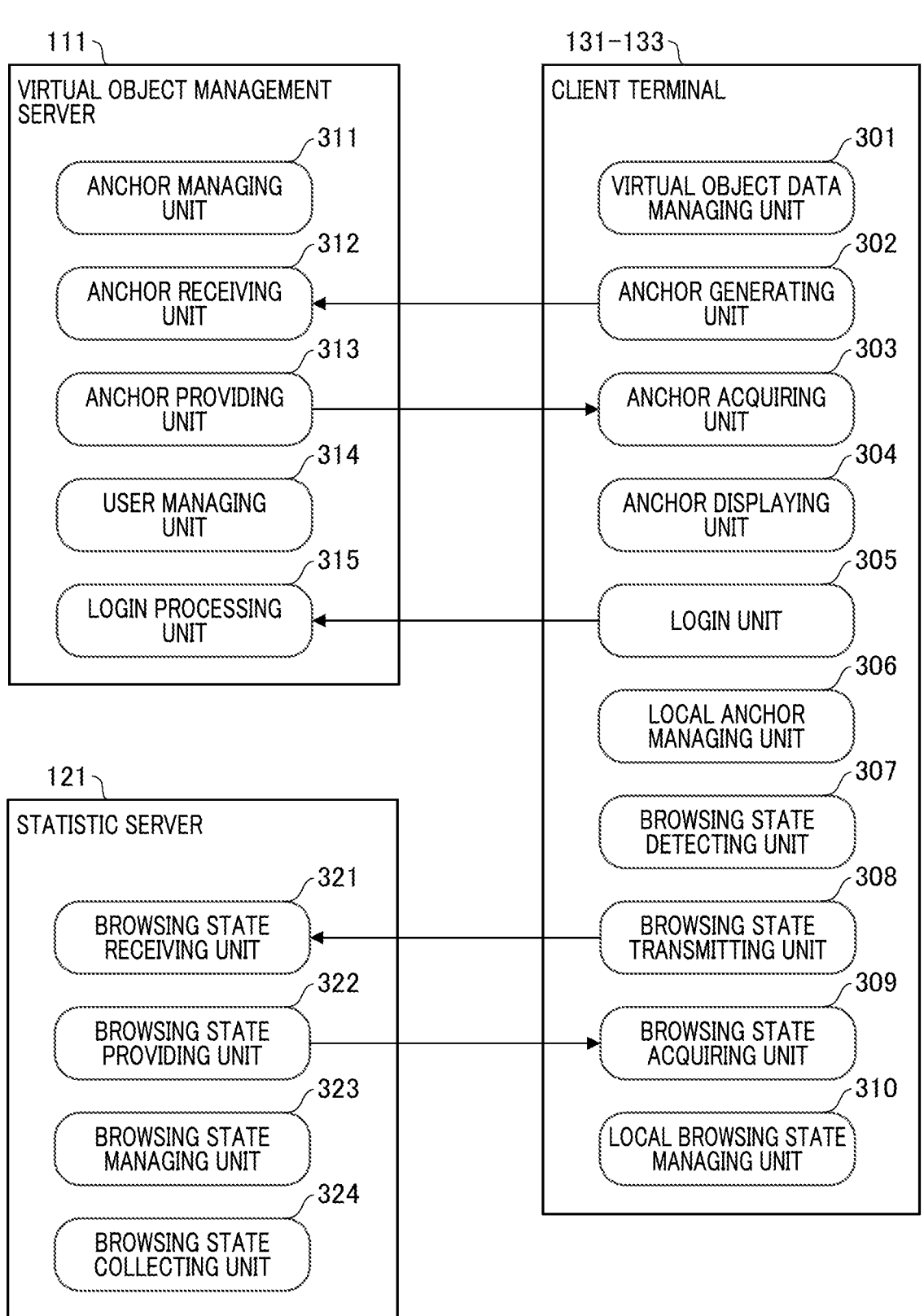
FIG. 4 is a diagram illustrating a software configuration of the virtual object management system.

FIG. 4 is a diagram illustrating a software configuration of the virtual object management system according to this embodiment. The software configuration of the client terminals 131 to 133 illustrated in FIG. 4 is realized by causing the CPU 202 and the GPU 210 to perform processes in accordance with a program stored in the memory (the ROM 204 or the HDD 205). Similarly, the software configuration of the virtual object management server 111 and the statistic server 121 illustrated in FIG. 4 is realized by causing the CPU 222 to perform processes in accordance with a program stored in the memory (the ROM 224 or the HDD 225).

The virtual object management server 111 includes an anchor managing unit 311, an anchor receiving unit 312, an anchor providing unit 313, a user managing unit 314, and a login processing unit 315. The user managing unit 314 manages user information of users who use the virtual object management system. Table 1 is an example of a user information management table that is managed by the user managing unit 314.

TABLE 1

| User ID | Password | Authority | Login validity period |
|---|---|---|---|
| userA | ********** | Viewer | 2022/12/31 0:00:00 |
| userB | ********** | Viewer | 2022/12/31 0:00:00 |
| userC | ********** | Viewer | 2022/12/31 0:00:00 |
| userX | ********** | owner | 2022/12/31 0:00:00 |
| userY | ********** | owner | 2022/12/31 0:00:00 |
| . | . | . | . |
| . | . | . | . |
| . | . | . | . |

In the user attribute information management table, a user ID, a password, an authority of a user, and a login validity period are managed. In the user attribute information management table, user attribute information such as a user name, age, and sex may be managed. The user ID is information for uniquely identifying a user. The password is a password that is set by a user and used for login authentication (basic authentication). An authority column represents an authority of each user. In this embodiment, out of the client terminals 131 to 133, a client terminal that has logged in with the authority "viewer" is referred to as a viewer terminal, and a client terminal that has logged in with the authority of "owner" is referred to as an owner terminal. A user who has logged in with the authority of "viewer" is referred to as a viewer. A viewer can view a virtual object disposed by an owner. A user who has logged in with the authority of "owner" is referred to as an owner. An owner has an authority to dispose and view a virtual object. The login validity period indicates a validity period of an authenticated state of a logged-in user. The user attribute information management table may include a column of concealment attributes indicating whether a browsing state is to be disclosed.

The login processing unit 315 receives a login request from the client terminals 131 to 133, compares the login request with the user information managed by the user managing unit 314, and returns the login processing result to the client terminals 131 to 133. The login processing unit 315 compares a combination of a user ID and a password included in the login request with the user information (Table 1) managed by the user managing unit 314. When information of the login request matches the user information managed by the user managing unit 314 as a result of comparison, the login processing unit 315 returns the login processing result as success to the client terminals 131 to 133.

The anchor managing unit 311 manages anchor information. Table 2 is an example of an anchor management table that is managed by the anchor managing unit 311. An anchor includes an anchor ID, a session ID, virtual object data, a feature quantity, position information, sensor information, and a producer.

TABLE 2

| Anchor ID | Session ID | Virtual object data | Feature quantity | Position information | Sensor information | producer |
|---|---|---|---|---|---|---|
| a | 111 | abc.obj | xxx.dat | (1, 23, 31) | Beacon: 123 | userX |
| b | 222 | bbb.obj | yyy.dat | (1, 3, 22) | Beacon: 123 | userX |
| c | 333 | ccc.obj | zzz.dat | (25, 3, 41) | Wifi: 345 | userX |
| d | 111 | ddd.obj | aaa.dat | (10, 10, 1) | Wifi: 345 | userX |
| . | . | . | . | . | . | . |
| . | . | . | . | . | . | . |

The anchor ID is identification information for uniquely identifying an anchor and may be identification information corresponding to a virtual object. The anchor ID is allocated when the anchor receiving unit 312 stores a record in the anchor management table. The session ID is an identifier for correlating a plurality of anchors with one group. The same session ID is allocated to anchors in the same session. By correlating a plurality of anchors with one session ID, a plurality of anchors with the same session ID can be simultaneously presented to users. That is, with the provision method determined using a session ID as a condition, it is possible to provide another virtual object different from a virtual object.

The virtual object data is data of a 3D model of a virtual object in an arbitrary format. The feature quantity, the position information, and the sensor information are feature quantities for displaying a virtual object in association with the real world. The feature quantity represents three-dimensional information of the real world which is acquired, for example, by analyzing data obtained by imaging the surroundings of an anchor using the camera 207. The position information is information indicating a three-dimensional position of a virtual object in the real world. The sensor information is position information (coordinates in a GPS) in which an anchor is disposed, a beacon associated with an anchor, a WiFi ID, or the like. A place in which a virtual object is installed can be identified on the basis of the beacon associated with an anchor and the WiFi ID. As the producer, one of values in the user ID column in Table 1 which is a user ID of a user having prepared the anchor is stored.

The anchor receiving unit 312 receives an anchor registration request from the client terminals 131 to 133. Then, the anchor receiving unit 312 stores an anchor included in the received anchor registration request in the anchor managing unit 311. The anchor providing unit 313 receives an anchor acquisition request from the client terminals 131 to 133, retrieves an anchor satisfying the condition from the anchor managing unit 311, and returns the retrieved anchor to the client terminals 131 to 133. The anchor providing unit 313 can return one anchor correlated with a specific anchor ID in response to the anchor acquisition request from the client terminals 131 to 133 or may return a plurality of anchors correlated with the same session ID or the same sensor ID. The anchor acquisition request from the client terminals 131 to 133 includes information of a login user (such as a user ID). Accordingly, the anchor providing unit 313 can also control whether an anchor is to be provided on the basis of the information of a login user included in the anchor acquisition request.

The client terminals 131 to 133 each include a virtual object data managing unit 301, an anchor generating unit 302, an anchor acquiring unit 303, an anchor displaying unit 304, a login unit 305, and a local anchor managing unit 306. The client terminals 131 to 133 includes a browsing state detecting unit 307, a browsing state transmitting unit 308, a browsing state acquiring unit 309, and a local browsing state managing unit 310 for managing a browsing state of a shared virtual object.

The virtual object data managing unit 301 manages 3D data of a virtual object. 3D data in various formats stored in the virtual object data managing unit 301 is a virtual object that can be freely disposed to overlap the real world by a user. The anchor generating unit 302 prepares an anchor in accordance with a user's operation. A user selects a 3D model stored in the virtual object data managing unit 301 using the anchor generating unit 302 and disposes a virtual object in the real world through a finger motion imaged by the camera 207 or an operation of a touch panel of the display 206.

When a virtual object is disposed, the anchor generating unit 302 extracts a feature quantity around the place in which the virtual object is disposed by analyzing an image and stores the extracted feature quantity in the local anchor managing unit 306 in correlation with the virtual object. The anchor generating unit 302 identifies position information of the virtual object using a GPS sensor connected thereto via the interface 208 and correlates the identified position information with the anchor. A user can correlate the anchor with the sensor using the anchor generating unit 302. The anchor generating unit 302 stores the generated anchor in the local anchor managing unit 306 and transmits the generated anchor to an anchor receiving unit 312.

The anchor acquiring unit 303 acquires an anchor (a virtual object) from the virtual object management server 111. Specifically, the anchor acquiring unit 303 transmits an anchor acquisition request to the virtual object management server 111 and receives an anchor from the virtual object management server 111 as a response to the anchor acquisition request. Then, the anchor acquiring unit 303 stores the anchor acquired from the virtual object management server 111 in the local anchor managing unit 306. The anchor acquiring unit 303 adds identification information of the virtual object or a feature quantity for displaying the virtual object in correlation with the real world to the anchor acquisition request to be transmitted to the virtual object management server 111. The feature quantity is a feature quantity in the real world extracted through imaging using the camera 207, position information such as a GPS signal, WiFi or beacon information, sensor information such as a signal detected by a sensor for detecting a Bluetooth signal connected to the interface 208, or the like. The feature quantity may be information read from an image code using the camera 207. By transmitting the anchor acquisition request using the feature quantity, an anchor near a current location based on the GPS signal or an anchor correlated with the detected WiFi or beacon information can be acquired.

The anchor displaying unit 304 disposes the virtual object included in the anchor in the real world on the basis of the feature quantity included in the anchor. The anchor displaying unit 304 compares the feature quantities included in the anchors stored in the local anchor managing unit 306 with an image of the real world captured by the camera 207 and disposes the virtual object included in the anchor in a part which matches the feature quantity of an area in the real space. The local anchor managing unit 306 manages the anchor in each client terminal. The local anchor managing unit 306 stores and manages the anchor generated by each client terminal and the anchor acquired from the virtual object management server 111.

Figure 5A:
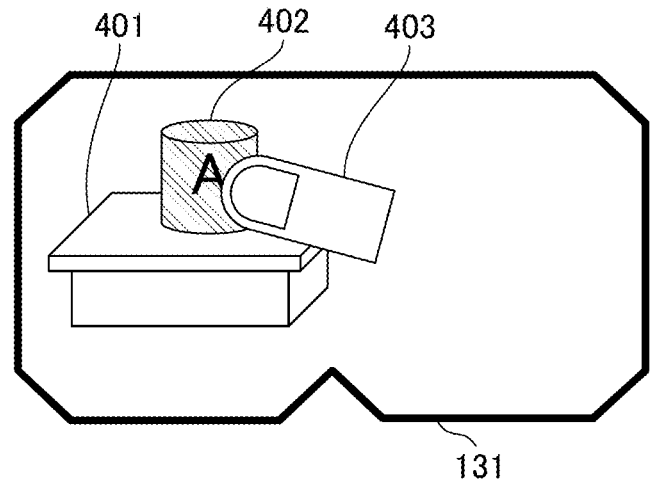
FIGS. 5A to 5C are diagrams illustrating a field of sight of a user who registers and views a shared virtual object.

An example of display of a virtual object in client terminals will be described below with reference to FIGS. 5A to 5C. FIG. 5A is a diagram illustrating an image which is displayed on the display 206 of the client terminal 131 of an HMD type. The client terminal 131 in this embodiment is an owner terminal that is operated by an owner who has logged in with the authority of "owner." The owner has the authority to dispose and view a virtual object and can dispose the virtual object using the owner terminal. The owner operates a cylindrical virtual object 402 stored in the virtual object data managing unit 301 of the client terminal 131 using a gesture of a finger 403 on the client terminal 131 and disposes the virtual object 402 on a desk 401 in the real world. The operation of the finger 403 is only an example, and the operation method is not limited thereto.

Figure 5B:
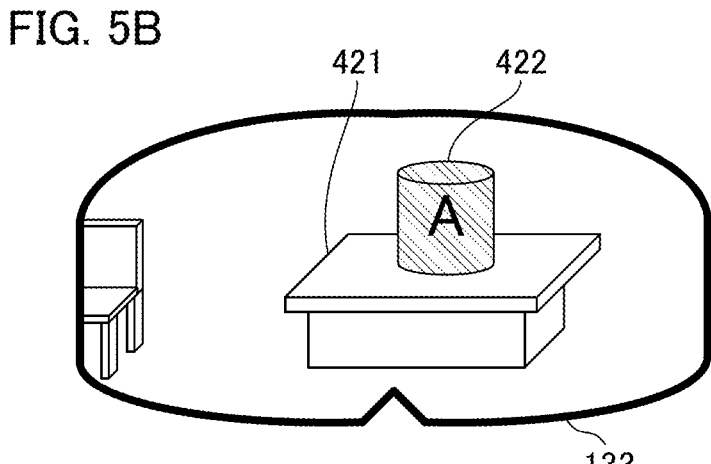
Figure 5C:
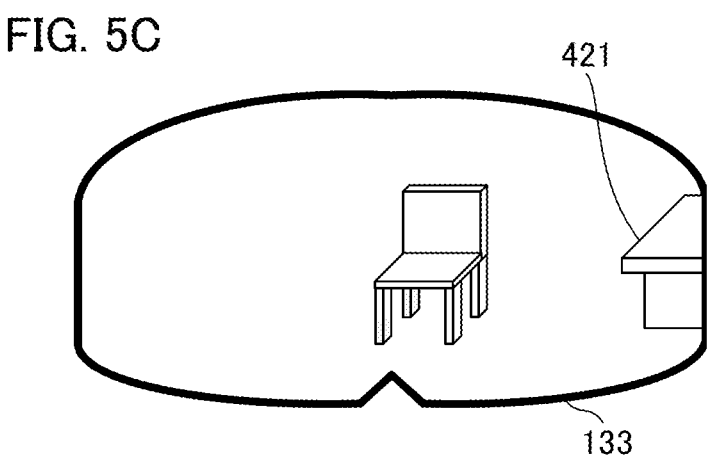

FIGS. 5B and 5C are diagrams illustrating an image which is displayed on the display 206 of the HMD type client terminal 133. The client terminal 133 in this embodiment is a viewer terminal that is operated by a viewer who has logged in with the authority of "viewer." The viewer can view the virtual object disposed by the owner using the viewer terminal. The client terminals 131 to 133 have the same configuration regardless of whether they are an owner terminal or a viewer terminal, and are different simply in login users. The anchor generating unit 302 extracts a feature quantity by analyzing an image obtained by imaging the surroundings of the place at which the virtual object is disposed using the camera 207 and stores the extracted feature quantity in the local anchor managing unit 306 in correlation with the virtual object. In FIG. 5B, a cylindrical virtual object 402 which has been disposed on a desk 401 using the client terminal 131 by an owner is viewed as a cylindrical virtual object 422 on a desk 421 with the same feature quantity using the client terminal 133 by a viewer. On the other hand, in FIG. 5C, a part of the desk 421 is included in the field of sight, but the field of sight has not reached the position at which the virtual object 422 is to be displayed. Accordingly, the anchor displaying unit 304 does not display the virtual object 422.

The login unit 305 transmits a user name and a password to the login processing unit 315 of the virtual object management server 111 and performs authentication of a user. The authentication process is performed, for example, using a combination of the user name and the password. The use name and the password are input, for example, by a motion of a user's finger imaged using the camera 207, an operation of the touch panel of the display 206, a keyboard connected to the interface 208, or the like. When the authentication of a user is performed by the login processing unit 315 of the virtual object management server 111 and the user can log in to the service of providing the virtual object, the virtual object can be displayed. The login method is not limited to a method using a combination of a user name and the password. For example, biometric authentication such as face authentication using a face image captured by the camera 207, iris authentication using an iris, or fingerprint authentication using a fingerprint sensor connected to the interface 208 may be used.

A configuration for ascertaining a browsing state of a virtual object from the client terminal 131 which is an owner terminal to a viewer terminal will be described below. The client terminals 131 to 133 each include a browsing state detecting unit 307, a browsing state transmitting unit 308, a browsing state acquiring unit 309, and a local browsing state managing unit 310. Among these constituents, the browsing state detecting unit 307, the browsing state transmitting unit 308, and the local browsing state managing unit 310 in the viewer terminal perform the process. On the other hand, the browsing state acquiring unit 309 and the local browsing state managing unit 310 in the owner terminal perform the process.

The browsing state detecting unit 307 and the browsing state transmitting unit 308 are software modules operating in the client terminal 133 which is a viewer terminal. The browsing state detecting unit 307 detects a browsing state of the virtual object in the client terminal 133, that is, whether the virtual object is actually viewed by the client terminal 133. The browsing state detecting unit 307 detects the browsing state of the virtual object in the client terminal 133 by determining whether the anchor displaying unit 304 displays the virtual object on the display 206. Here, a state indicating whether the virtual object 422 is actually displayed on the client terminal 133 which is a viewer terminal is defined as a "browsing state." An example of data of the browsing state managed in a viewer terminal is described below in a JSON format. "visible" is a browsing state flag indicating the browsing state.

```
{
  "session": {
    "sessionId": "111",
    "sessionName": "Class 1",
    "users": [
      {
        "userId": "userA",
        "displayUserName": "User A",
        "anchors": [
          {
            "anchorId": "a",
            "anchorName": "Cylinder A",
            "visible": true   // virtual object is being viewed
          }
        ]
      }
    ]
  }
}
```

For example, in the state illustrated in FIG. 5B, since the anchor displaying unit 304 of the client terminal 133 displays the virtual object 422, the browsing state detecting unit 307 determines that the virtual object 422 is viewed. When it is determined that the virtual object is viewed, the browsing state detecting unit 307 sets "visible" in the data to be true. On the other hand, in the state illustrated in FIG. 5C, a part of the desk 421 is included in the field of sight, but the field of sight has not reached the position at which the virtual object 422 is to be displayed, and the anchor displaying unit 304 does not display the virtual object 422. Accordingly, the browsing state detecting unit 307 determines that the virtual object 422 is not viewed and sets "visible" in the data to be false. The field of sight illustrated in FIG. 5B is achieved by moving the client terminal 133 to the right from the field of sight illustrated in FIG. 5C. When the field of sight illustrated in FIG. 5B is achieved and the anchor displaying unit 304 displays the virtual object 422, the browsing state detecting unit 307 determines that the virtual object 422 is viewed and updates "visible" in the data from false to true. The browsing state detecting unit 307 stores the detected browsing state in the local browsing state managing unit 310.

The browsing state transmitting unit 308 transmits data of the browsing state of the virtual object 422 in the client terminal 133 detected by the browsing state detecting unit 307, that is, the browsing state represented in the JSON format, to the statistic server 121. The browsing state transmitting unit 308 transmits the browsing state of the virtual object 422 in the client terminal 133 to the statistic server 121 on the basis of change of the browsing state.

The browsing state acquiring unit 309 is a software module operating in the client terminal 131 which is an owner terminal. The browsing state acquiring unit 309 acquires the browsing state of the virtual object 422 for each user from a browsing state providing unit 322 of the statistic server 121. The client terminal 131 which is an owner terminal can ascertain actual browsing states of the users by acquiring the browsing states via the browsing state acquiring unit 309. The browsing state acquiring unit 309 stores the browsing states of the virtual object acquired from the statistic server 121 in the local browsing state managing unit 310.

The local browsing state managing unit 310 stores the browsing state of the virtual object 422 detected by the browsing state detecting unit 307 and the browsing state of the virtual object 422 for each viewer acquired by the browsing state acquiring unit 309.

The statistic server 121 includes a browsing state receiving unit 321, a browsing state providing unit 322, a browsing state managing unit 323, and a browsing state collecting unit 324. The browsing state receiving unit 321 receives the browsing state of the virtual object 422 as data on display of the virtual object 422 in the client terminal 133 from the browsing state transmitting unit 308 of the client terminal 133 which is a viewer terminal. The browsing state receiving unit 321 stores the browsing state of the virtual object received from the viewer terminal in the browsing state managing unit 323.

The browsing state providing unit 322 provides the browsing state for each user managed by the browsing state managing unit 323 of the statistic server 121 in response to a request from the browsing state acquiring unit 309 of the client terminal 131 which is an owner terminal. The browsing state managing unit 323 stores the browsing state received by the browsing state receiving unit 321 and the browsing states collected by the browsing state collecting unit 324. The browsing state collecting unit 324 collects the browsing states stored in the browsing state managing unit 323 such that the browsing states can be easily handled in the owner terminal, and stores the collected browsing states in the browsing state managing unit 323 again. As described above, it is possible to ascertain a browsing state of a user by causing the client terminal 133 which is a viewer terminal to perform detection of the browsing state and transmission to the statistic server 121 and causing the client terminal 131 which is an owner terminal to acquire the browsing state from the statistic server 121.

Figure 6:
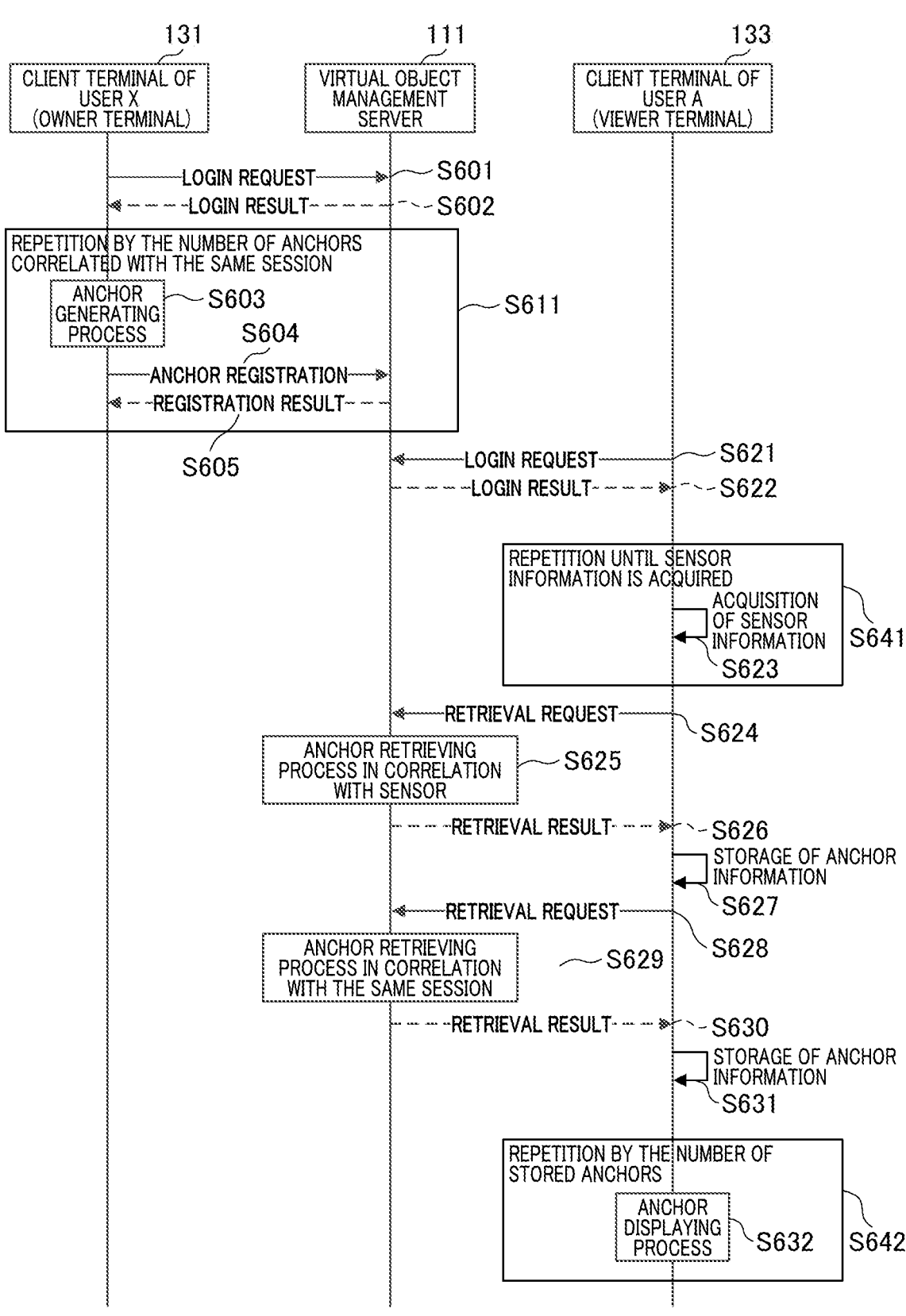
FIG. 6 is a sequence diagram illustrating a flow of a process of registering and displaying a shared virtual object.

Processes of registering an anchor generated by the client terminal 131 in the virtual object management server 111 and causing the client terminal 133 to acquire and display the anchor stored in the virtual object management server 111 will be first described below. FIG. 6 is a sequence diagram illustrating a flow of a process of registering and displaying a virtual object. A user who is an owner operating the client terminal 131 is defined as "userX" in Table 1 and a user who is a viewer operating the client terminal 133 is defined as "userA" in Table 1. An anchor which is registered by userX operating the client terminal is an anchor indicated with an anchor ID of "a" in Table 2. The process which is performed by the client terminal in FIG. 6 is realized by causing the CPU 202 or the GPU 210 of the client terminal to read a program stored in the memory to the RAM 203 and to execute the program. The process which is performed by the virtual object management server 111 in FIG. 6 is realized by causing the CPU 222 of the virtual object management server 111 to read a program stored in the memory to the RAM 223 and to execute the program.

A sequence of causing the client terminal 131 operated by userX to register an anchor in the virtual object management server 111 in from S601 to S605 will be first described below. In S601, the login unit 305 of the client terminal 131 transmits a user ID and a password input by the user to the login processing unit 315 of the virtual object management server 111. In S602, the login processing unit 315 of the virtual object management server 111 verifies user information received from the client terminal 131 and returns a result of the user authentication process for login to the client terminal 131. For example, when it is ascertained that the user information received from the client terminal 131 matches userX with the user ID and the password managed by the user managing unit 314, the login processing unit 315 returns a login result indicating that login has succeeded to the client terminal 131.

In S603, the anchor generating unit 302 of the client terminal 131 generates an anchor of a virtual object which is disposed by userX and stored in the virtual object data managing unit 301 and stores the generated anchor in the local anchor managing unit 306. In S604, the anchor generating unit 302 of the client terminal 131 transmits an anchor registration request of the anchor generated in S603 to the anchor receiving unit 312 of the virtual object management server 111. In S605, the anchor receiving unit 312 of the virtual object management server 111 registers the anchor received from the client terminal 131 in the anchor managing unit 311 and returns the registration result to the anchor generating unit 302 of the client terminal 131. When it is intended to register a plurality of anchors with the same session ID, the process (S603 to S605) described in S611 is repeatedly performed.

Figure 7:
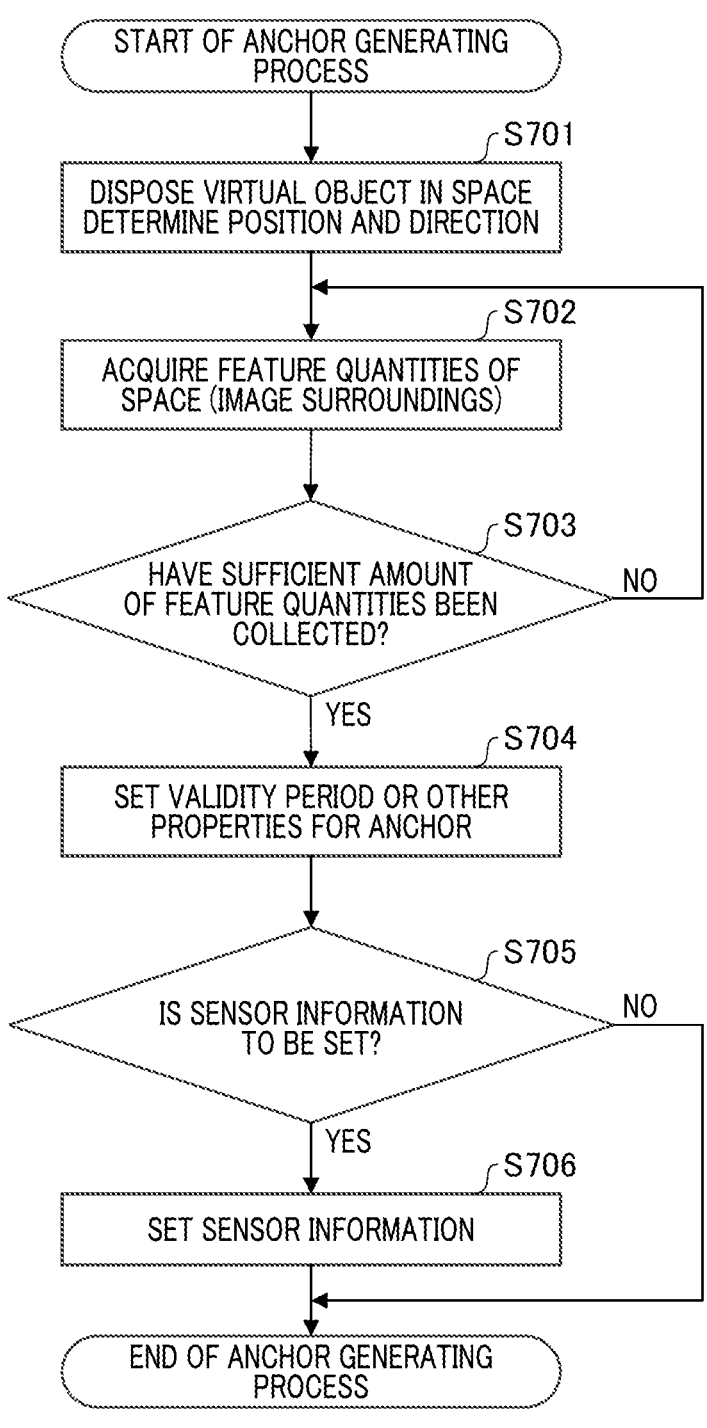
FIG. 7 is a flowchart illustrating an anchor generating process.

Details of the anchor generating process which is performed by the anchor generating unit 302 of an owner terminal in S603 will be described below with reference to FIG. 7. FIG. 7 is a flowchart illustrating the anchor generating process. The processes illustrated in FIG. 7 are realized by causing the CPU 202 or the GPU 210 of the client terminal 131 to read a program stored in the memory to the RAM 203 and to execute the program.

In S701, the anchor generating unit 302 disposes a virtual object in a space of the real world according to a user's operation and determines a position and a direction of the virtual object. Then, in S702, the anchor generating unit 302 images the surroundings using the camera 207 and acquires a three-dimensional feature quantity of the space. In S703, the anchor generating unit 302 determines whether a sufficient amount of feature quantities has been collected in S702. When it is determined that a sufficient amount of feature quantities has not been collected, the anchor generating unit 302 performs the process of S702 again. On the other hand, when it is determined that a sufficient amount of feature quantities has been collected, the anchor generating unit 302 performs the process of S704.

In S704, the anchor generating unit 302 sets the feature quantity acquired in S702, a validity period, or other necessary properties for the anchor. The validity period or properties information set for the anchor may be set in accordance with a user's operation or default settings may be automatically added thereto. In S705, the anchor generating unit 302 determines whether sensor information is to be set for the anchor. The anchor generating unit 302 determines whether sensor information is to be set for the anchor, for example, depending on whether sensor information which can be set for the anchor by the client terminal 131 such as GPS information has been detected. The anchor generating unit 302 may display a screen for ascertaining whether sensor information is to be set to the user and determine whether sensor information is to be set for the anchor in accordance with the user's operation. When it is determined that sensor information is to be set for the anchor, the process of S706 is performed. On the other hand, when it is determined that sensor information is not to be set for the anchor, this routine ends.

In S706, the anchor generating unit 302 sets sensor information for the anchor. For example, when sensor information which can be set for the anchor by the client terminal 131 has been detected, the anchor generating unit 302 sets the detected sensor information for the anchor. The anchor generating unit 302 may receive settings based on the type of a sensor designated by the user and set the sensor information for the anchor. For example, the anchor generating unit 302 correlates information of the anchor with beacon of id=123 in accordance with the user's operation. In this way, the anchor generating unit 302 generates an anchor for which property information such as the feature quantity of the space and the validity period and sensor information have been set for the virtual object which has been generated and disposed in the real space by the owner terminal and registers the generated anchor in the virtual object management server 111.

A sequence of causing the client terminal 133 operated by userA to acquire a virtual object from the virtual object management server 111 and to display the acquired virtual object in from S621 to S632 will be described below. In S621, the login unit 305 of the client terminal 133 transmits a user ID and a password input by the user to the login processing unit 315 of the virtual object management server 111. In S622, the login processing unit 315 of the virtual object management server 111 verifies the user information received from the client terminal 131 and returns a result of the user authentication process for login to the client terminal 133. For example, when it is ascertained that the user information received from the client terminal 133 matches userA of the user ID and the password managed in the user managing unit 314, the login processing unit 315 returns the login result indicating that login has succeeded to the client terminal 131.

In S623, the anchor acquiring unit 303 of the client terminal 133 acquires sensor information. The anchor acquiring unit 303 acquires a signal from a beacon terminal as the sensor information, for example, via a sensor which is connected to the client terminal 133 via the interface 208 and which detects a Bluetooth signal. The acquired sensor information may be information of WiFi connected to the client terminal 133, information read from an image code via the camera 207, or the like. When sensor information has not been acquired, the anchor acquiring unit 303 repeats the process of S623 until sensor information is acquired as described in S641.

In S624, the anchor acquiring unit 303 of the client terminal 133 transmits a virtual object provision request (an anchor retrieval request) to the anchor providing unit 313 of the virtual object management server 111. The anchor retrieval request includes at least one of identification information of an anchor (that is, identification information corresponding to a virtual object) and a feature quantity in the real world for displaying the virtual object and user information. For example, the anchor retrieval request includes the user information and the sensor information acquired in S623. For example, when a signal from a beacon terminal of id=123 has been detected in S623, the anchor acquiring unit 303 transmits an anchor retrieval request correlated with the beacon terminal of id=123 along with the user information of userA to the anchor providing unit 313. In this embodiment, an example in which sensor information of one feature quantity in the real world for displaying the virtual object in S623 in addition to the user information is acquired and the virtual object management server 111 is requested to provide a virtual object using the acquired information has been described above. However, the present invention is not limited thereto, and information acquired in S623 and transmitted to the virtual object management server 111 in S624 may be other information indicating a feature quantity or may be identification information corresponding to the virtual object.

In S625, the anchor providing unit 313 of the virtual object management server 111 retrieves an anchor from the anchor managing unit 311 on the basis of the anchor retrieval request received from the client terminal 133 and determines an anchor to be returned to the client terminal 133. For example, when the received request includes identification information corresponding to a virtual object, the anchor providing unit 313 determines information of the virtual object (anchor) corresponding to the identification information as the anchor to be returned. When the received request includes a feature quantity, the anchor providing unit 313 narrows the anchor to be returned on the basis of the feature quantity and the anchor information managed by the anchor managing unit 311. For example, the anchor providing unit 313 retrieves an anchor correlated with the beacon terminal of id=123 from the anchor managing unit 311 with reference to the user information management table or the like and determines the anchor to be returned.

In S627, the anchor acquiring unit 303 of the client terminal 133 stores the anchor acquired from the virtual object management server 111 in the local anchor managing unit 306. In S628, the anchor acquiring unit 303 of the client terminal 133 transmits a retrieval request for an anchor in the same session as the anchor acquired in S627 to the anchor providing unit 313 of the virtual object management server 111. For example, when an anchor with an anchor ID of "a" is acquired in S627, the anchor acquiring unit 303 transmits a retrieval request for the same anchor as the anchor with an anchor ID of "a" and with a session ID of "111" to the anchor providing unit 313. When anchors with an anchor ID of "a" and "b" are acquired in S627, the anchor acquiring unit 303 transmits a retrieval request for the anchors with session IDs of "111" and "222" to the anchor providing unit 313.

In S629, the anchor providing unit 313 of the virtual object management server 111 retrieves an anchor different from the provided anchor with the same session ID from the anchor managing unit 311 on the basis of the session ID received from the client terminal 133. Then, in S630, the anchor providing unit 313 of the virtual object management server 111 returns the retrieval result in S629 to the client terminal 133. When an anchor of the same session has been retrieved in S629, the anchor providing unit 313 returns the anchor retrieved in S629 to the anchor acquiring unit 303 of the client terminal 133. For example, the anchor providing unit 313 retrieves an anchor of session ID=111 and transmits an anchor of session ID=111 with an anchor ID of "d" to the client terminal 133. On the other hand, when an anchor of the same session has not been retrieved in S629, the anchor providing unit 313 transmits notification indicating that there is no anchor belonging to the same session to the client terminal 133.

In S631, the anchor acquiring unit 303 of the client terminal 133 stores the anchor acquired from the anchor providing unit 313 in S630 in the local anchor managing unit 306. In S642, the anchor displaying unit 304 of the client terminal 133 displays a virtual object on the basis of the anchor acquired from the virtual object management server 111 and stored in the local anchor managing unit 306 in S627 and S631. When there are two or more anchors stored in the local anchor managing unit 306 in S627 and S631, the anchor displaying unit 304 repeats the virtual object displaying process of S642 by the number of anchors stored in S642. In this embodiment, when the anchor displaying unit 304 of the client terminal 133 displays a virtual object, the browsing state detecting unit 307 detects a browsing state of the virtual object, and the process of transmitting the browsing state to the statistic server 121 is performed.

Figure 8:
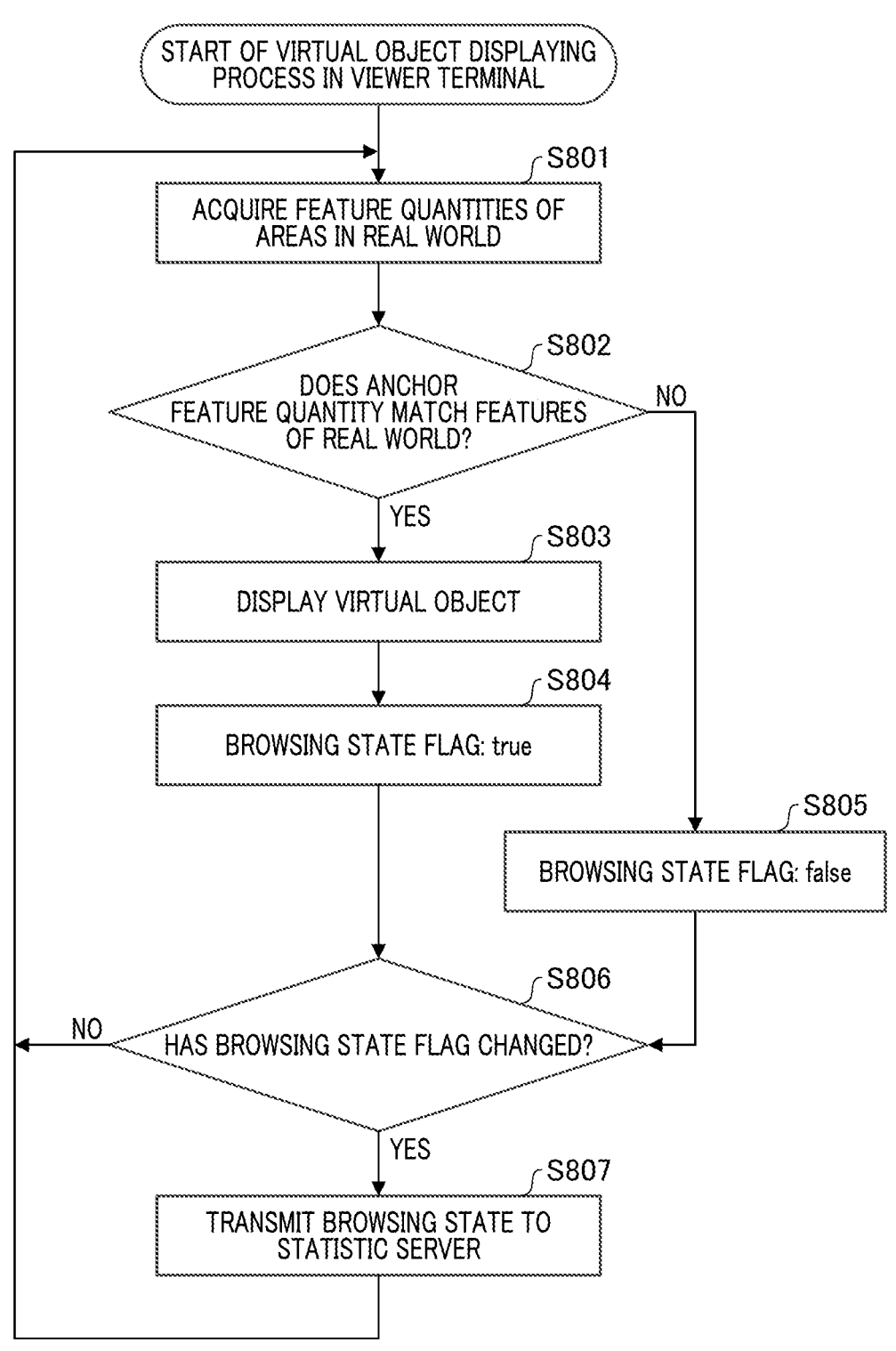
FIG. 8 is a flowchart illustrating a virtual object displaying process which is performed by a viewer terminal.

Details of the anchor displaying process which is performed by the anchor displaying unit 304 in S632 will be described below. FIG. 8 is a flowchart illustrating the anchor displaying process in a viewer terminal. The processes illustrated in FIG. 8 are realized by causing the CPU 202 or the GPU 210 of the client terminal 133 to read a program stored in the memory to the RAM 203 and to execute the program.

In S801, the anchor displaying unit 304 acquires a feature quantity of an area in a real space from an image captured by the camera 207. In S802, the anchor displaying unit 304 determines whether the feature quantity of the area in the real space acquired in S801 matches a feature quantity of an anchor. When the feature quantity of the area in the real space acquired in S801 matches a feature quantity of an anchor, the process of S803 is performed. On the other hand, when the feature quantity of the area in the real space acquired in S801 does not match a feature quantity of an anchor, the process of S805 is performed.

In S803, the anchor displaying unit 304 displays a virtual object in the real space and displays the virtual object on the display 206. In S804, the browsing state detecting unit 307 sets the browsing state flag of the viewer for the anchor to "true" and stores the browsing state in the local browsing state managing unit 310.

In S805, the browsing state detecting unit 307 sets the browsing state flag of the viewer for the anchor to "false" and stores the browsing state in the local browsing state managing unit 310. In S807, the browsing state detecting unit 307 determines whether the browsing state flag for the virtual object has changed. When it is determined that the browsing state flag for the virtual object has changed, the process of S807 is performed. On the other hand, when it is determined that the browsing state flag for the virtual object has not changed, the process of S801 is performed again. In S807, the browsing state transmitting unit 308 transmits the browsing state of the virtual object to the browsing state receiving unit 321 of the statistic server 121 and performs the process of S801 again. The browsing state receiving unit 321 having acquired the browsing state of the virtual object as data on display of the virtual object on the terminal from the browsing state transmitting unit 308 of the viewer terminal stores the acquired browsing state in the browsing state managing unit 323. Hitherto, the process of displaying the virtual object correlated with the anchor generated by the client terminal 131 which is an owner terminal on the client terminal 133 which is a viewer terminal and transmitting the browsing state thereof to the statistic server 121 has been described. The client terminal 133 which is a viewer terminal repeatedly performs the process of displaying the virtual object and transmitting the browsing state to the statistic server 121 by performing the process illustrated in FIG. 8 while an application is operating.

The timing at which the browsing state transmitting unit 308 transmits the browsing state of the virtual object to the statistic server 121 and the transmission conditions thereof can be additionally controlled. For example, since a load may be applied to the statistic server 121 when a change of the browsing state occurs continuously for a short time, the browsing state transmitting unit 308 may perform control such that the browsing state of the virtual object is transmitted after a predetermined interval of time has elapsed. The timings at which the browsing state transmitting unit 308 transmits the browsing state of the virtual object and the statistic server 121 acquires the browsing state are timings at which the predetermined interval has elapsed, and thus it is possible to reduce the load of the statistic server 121.

Figure 9:
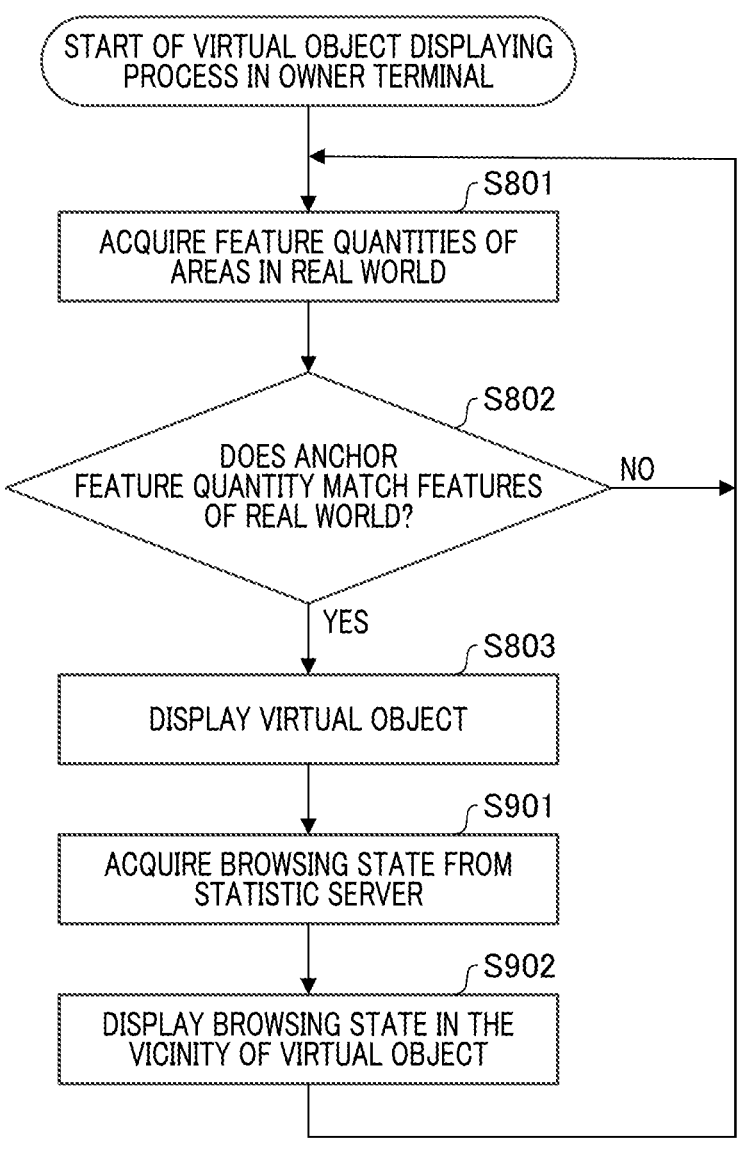
FIG. 9 is a flowchart illustrating a browsing state displaying process which is performed by an owner terminal.

The virtual object displaying process and the browsing state acquiring process in the client terminal 131 which is an owner terminal and a use example of the acquired browsing state will be described below with reference to FIGS. 9 and 10. FIG. 9 is a flowchart illustrating the virtual object displaying process in an owner terminal. The processes illustrated in FIG. 9 are realized by causing the CPU 202 or the GPU 210 of the client terminal 131 to read a program stored in the memory to the RAM 203 and to execute the program.

The virtual object displaying process in the client terminal 131 which is an owner terminal in S801 to S803 is the same as the virtual object displaying process in the client terminal 133 which is a viewer terminal and thus description thereof will be omitted. In S901, the browsing state acquiring unit 309 acquires the browsing state correlated with the anchor of the virtual object as information on the virtual object displayed in S803 from the browsing state providing unit 322 of the statistic server 121. For example, when the browsing state of the virtual object has changed or when the browsing state has been requested from the owner terminal, the browsing state providing unit 322 provides the browsing state of the virtual object to the owner terminal at a timing of a predetermined interval or the like. Then, the browsing state acquiring unit 309 stores the browsing state acquired from the statistic server 121 in the local browsing state managing unit 310. In S902, the anchor displaying unit 304 displays the browsing state of the viewer for the virtual object as a virtual object in the vicinity of the virtual object displayed in S803 on the basis of the browsing state acquired in S908 and performs the process of S801 again.

An example of display on the display 206 of the client terminal 131 which is an owner terminal when the anchor displaying unit 304 performs the process of S902 will be described below. FIG. 10 is a diagram illustrating an example of display of a browsing state according to the first embodiment. A virtual object 1001 and a virtual object 1002 are displayed in the vicinity of a shared virtual object 402. The virtual object 1001 is a virtual object indicating a browsing state of the shared virtual object 402. The virtual object 1001 is displayed as a result of the process of S902 which is performed by the anchor displaying unit 304. In the virtual object 1001, for example, a user ID of a user who is currently browsing the virtual object 402 (the same as the virtual object 422) is described. The number of users who are browsing the virtual object 402 is described in the virtual object 1002.

The viewer terminal repeatedly performs a process of detecting change of the browsing state of the virtual object and transmitting the detected change to the statistic server 121 through the process illustrated in FIG. 8. The owner terminal can easily ascertain the browsing state of the shared virtual object by repeating the process of acquiring the browsing state of the shared virtual object and displaying the browsing state of the virtual object as a virtual object through the process illustrated in FIG. 9. The process of causing the owner terminal to acquire the browsing state of the virtual object from the statistic server 121 in S901 may be performed with a predetermined interval. Accordingly, it is possible to reduce a communication rate and processing loads of the owner terminal and the statistic server 121.

It is considered that the browsing state (the browsing state flag) of the virtual object is fixed to browsing ("visible": true) when the application in the viewer terminal stops on the way. Therefore, before the application in the viewer terminal stops, the browsing state transmitting unit 308 can transmit the browsing state of the virtual object switched to non-browsing ("visible": false) to the statistic server 121. The user managing unit 314 can also update the browsing state by transmitting the flag switched to non-browsing to the browsing state receiving unit 321 such that the browsing state of the viewer is switched to non-browsing when the login validity period of the user described in Table 1 has expired.

As described above, according to this embodiment, the statistic server 121 can acquire the browsing state for the shared virtual object in the viewer terminal and provide information on the virtual object acquired on the basis of the acquired browsing state to the owner terminal. The owner terminal can display the browsing state of the virtual object on the basis of the information on the virtual object provided from the statistic server 121. Accordingly, the owner can ascertain the actual browsing state of the shared virtual object.

Second Embodiment

Figure 10:
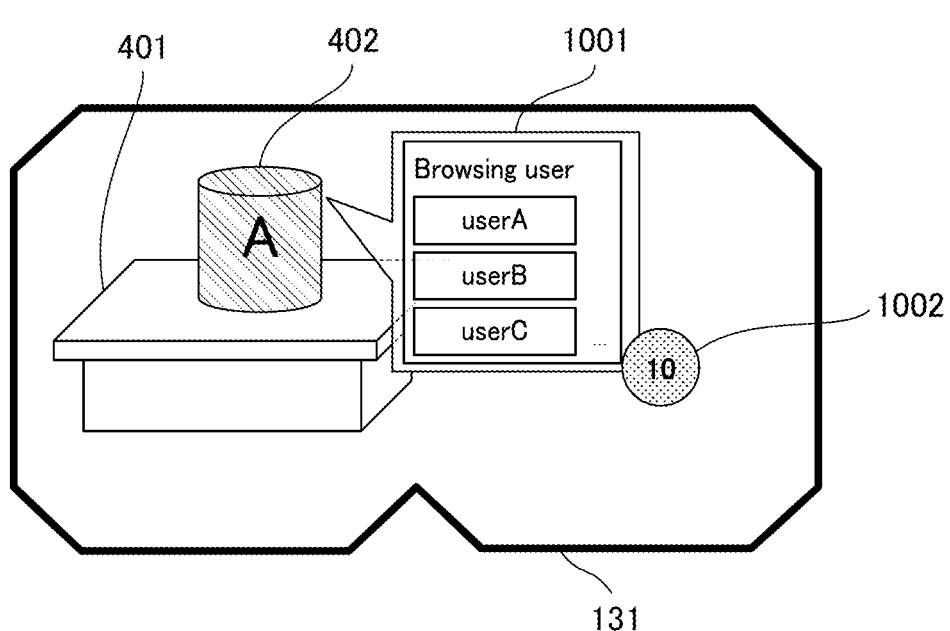
FIG. 10 is a diagram illustrating an example of display of a browsing state of a virtual object according to a first embodiment.

In the first embodiment, an example of display of a browsing state in which a list of users and the number of users who view a shared virtual object are displayed in the vicinity of the virtual object as illustrated in FIG. 10 has been described. In a second embodiment, an example in which a browsing state of a user is ascertained using a method different from that in the first embodiment will be described. For example, another more detailed ascertainment method can be realized by displaying a browsing state of a virtual object acquired by the browsing state acquiring unit 309 of the client terminal 131 which is an owner terminal on the display 206 in an arbitrary display mode. By causing the browsing state collecting unit 324 of the statistic server 121 to process and collect data in the JSON format, the browsing state providing unit 322 can provide a browsing state with a more amount of information.

Figure 11:
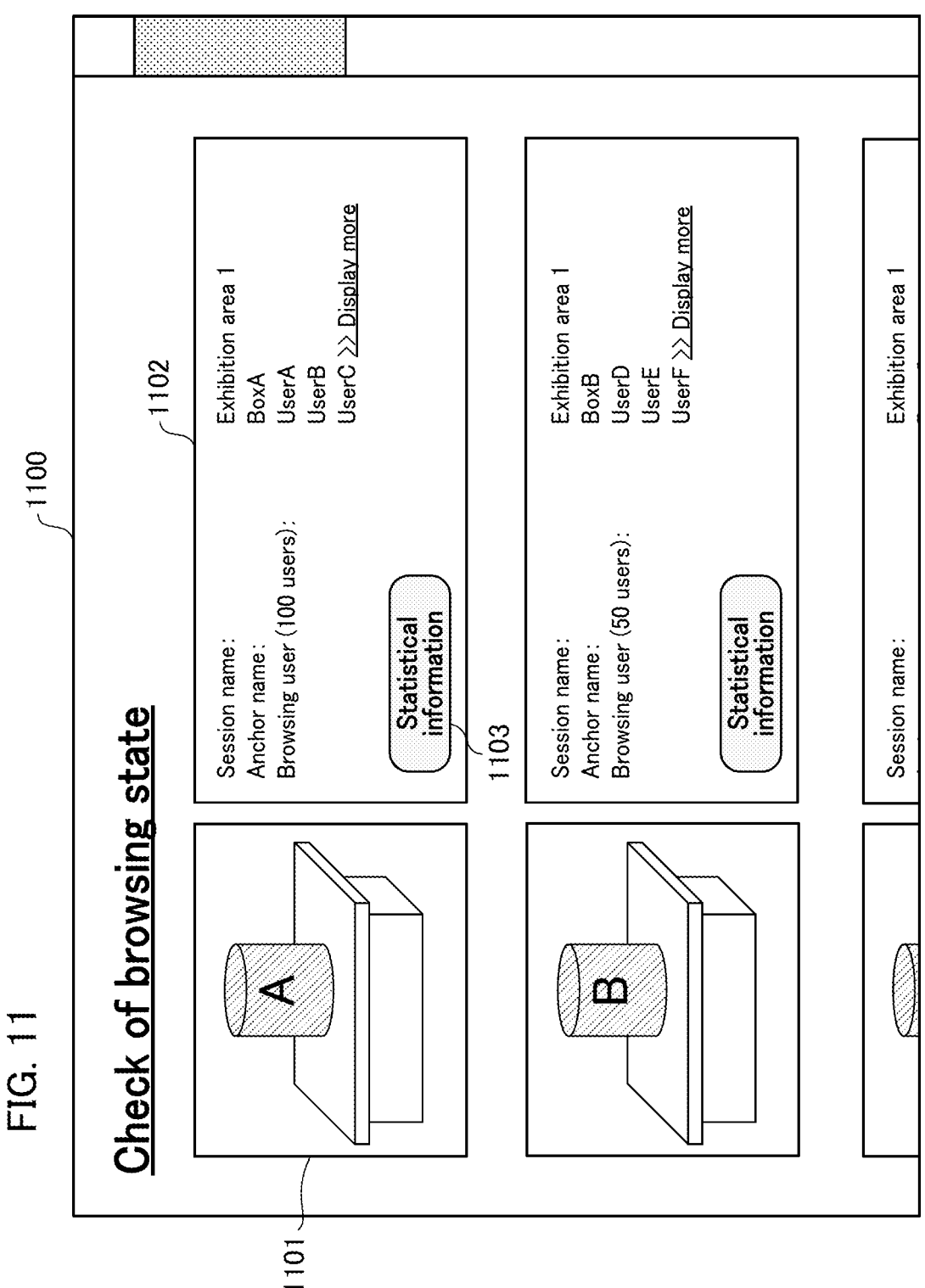
FIG. 11 is a diagram illustrating an example of display of a browsing state of a virtual object according to a second embodiment.
Figure 12:
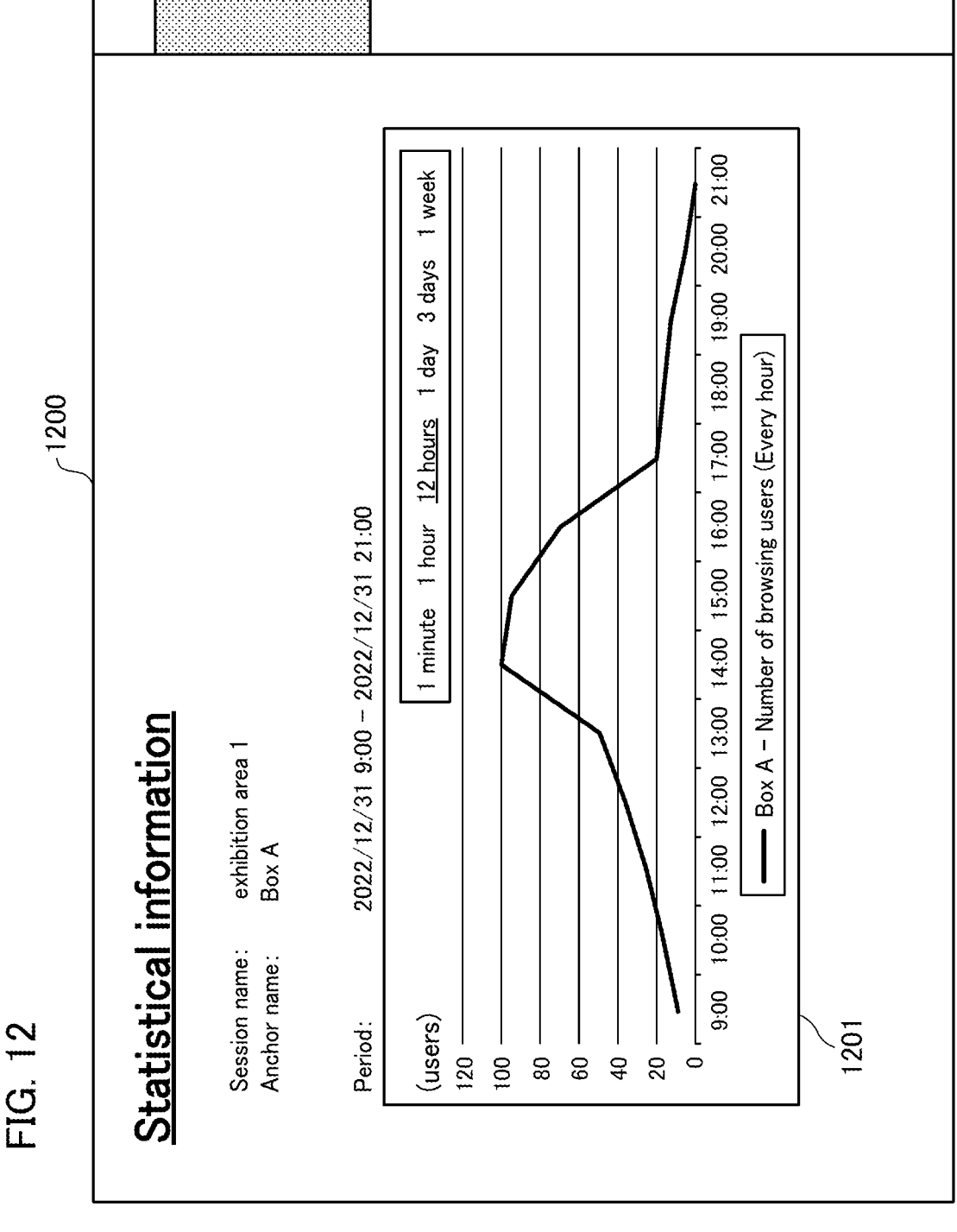
FIG. 12 is a diagram illustrating an example of statistical information of a virtual object according to a second embodiment.

FIGS. 11 and 12 are diagrams illustrating an example in which a browsing state of a virtual object is displayed according to the second embodiment. In the second embodiment, the client terminal 132 is assumed to be an owner terminal. The owner terminal does not have to be a head-mounted display, and the client terminal 132 may be a terminal such as a smartphone, a PC, or a tablet. A browsing state of a shared virtual object is displayed on the display 206 of the client terminal 132 which is the owner terminal.

A UI 1100 is a UI of an application for ascertaining a browsing state of a shared virtual object. The UI is provided by an application operating in the client terminal 132. The application has the software configuration (from the virtual object data managing unit 301 to the local browsing state managing unit 310) of a client terminal described above with reference to FIG. 3.

The browsing state acquiring unit 309 of the client terminal 132 acquires the browsing states collected by the browsing state collecting unit 324 of the statistic server 121 from the browsing state providing unit 322 and displays a UI 1100 on the display 206 on the basis of the collected browsing state. A thumbnail 1101 is a thumbnail of a virtual object of which the browsing state can be ascertained by the client terminal 132. An explanation section 1102 is an explanation section of the browsing state of the virtual object of the thumbnail 1101. A button 1103 is a button for displaying statistical information on the virtual object of the thumbnail 1101. When it is detected that the button 1103 is pressed by a user, the client terminal 132 displays the statistical information of the virtual object illustrated in FIG. 12.

FIG. 12 is a diagram illustrating an example of statistical information of a virtual object. A UI 1200 is a UI for displaying the statistical information of the virtual object of the thumbnail 1101. A graph 1201 represents statistical information of the browsing state of the virtual object corresponding to the thumbnail 1101. An example of statistic data required for displaying the graph 1201 will be described below. The statistic data is generated by the browsing state collecting unit 324 of the statistic server 121 and is stored in the browsing state managing unit 323.

```
{
    "session": {
        "sessionId": "999",
        "sessionName": "exhibition area 1"
    },
    "anchor": {
        "anchorId": "aaa",
        "sessionName": "box A"
    },
    "statistics": {
        "metrics": "total",
        "unit": "hour",
        "period": "",
        "data": [
            {"2022/12/31 9:00:00": 9},
            {"2022/12/31 10:00:00": 16},
            {"2022/12/31 9:00:00": 25},
            ...
            {"2022/12/31 21:00:00": 0}
        ]
    }
}
```

The statistic data is generated by causing the browsing state collecting unit 324 of the statistic server 121 to collect the browsing states of the virtual objects transmitted from the viewer terminals to the statistic server 121 and stored in the browsing state managing unit 323. Alternatively, by causing the browsing state acquiring unit 309 to designate query conditions when transmitting an acquisition request to the browsing state providing unit 322, the statistic data may be generated by causing the browsing state providing unit 322 to acquire the browsing states from the browsing state managing unit 323 and to process the acquired browsing states. The browsing state acquiring unit 309 of the client terminal 132 acquires the statistic data from the statistic server 121 and displays the graph 1201 based on the statistic data on the UI 1200.

Figure 13:
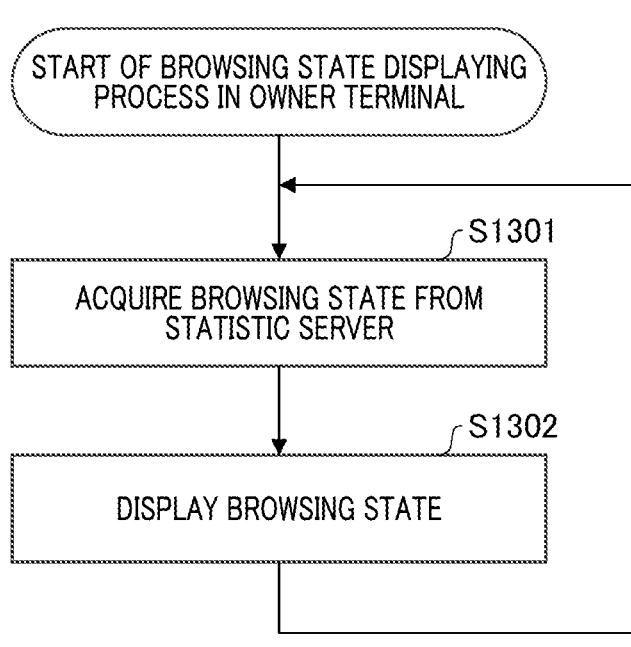
FIG. 13 is a flowchart illustrating a process of ascertaining a browsing state of a shared virtual object.

The process of causing the browsing state acquiring unit 309 to acquire the browsing states of the virtual objects including the statistic data and to display the UI 1100 or the UI 1200 will be described below. FIG. 13 is a flowchart illustrating the process of displaying a browsing state of a virtual object. The processes illustrated in FIG. 13 are realized by causing the CPU 202 or the GPU 210 of the client terminal 132 to read a program stored in the memory to the RAM 203 and to execute the program.

In S1301, the browsing state acquiring unit 309 of the client terminal 132 acquires the browsing states of the virtual objects including the statistic data from the browsing state providing unit 322 of the statistic server 121. Then, in S1302, the browsing state acquiring unit 309 updates a UI such as the UI 1100 with a newest browsing state on the basis of the browsing states acquired in S1301 and performs the process of S1301 again. By periodically repeatedly performing the process illustrated in FIG. 13, an owner can ascertain the browsing state of the virtual object in real time. In this embodiment, the process illustrated in FIG. 13 is described as a process of causing the browsing state acquiring unit 309 to periodically acquire and display the browsing state, but the browsing state acquiring unit 309 may acquire the browsing state at a timing at which the UI 1100 or the UI 1200 is started.

In this way, according to this embodiment, an owner can ascertain the browsing state of the virtual object or the statistical information associated with the browsing. The owner can ascertain the detailed browsing state of the virtual object in real time though the owner is not placed in the same space as a viewer.

Third Embodiment

In the first embodiment and the second embodiment, the method of allowing an owner terminal to ascertain a browsing state of a virtual object in a viewer terminal has been described, but the viewer terminal may want to ascertain the browsing state of the virtual object. In a third embodiment, a method of conditionally allowing a viewer terminal to ascertain a browsing state of a virtual object will be described. A viewer terminal can ascertain a browsing state of a virtual object by allocating an "owner" authority which is the same as an owner to a viewer, but extension of a user's authority is not preferable in operation.

There may be a viewer who does not want to open a user name thereof in association with a virtual object which is viewed by a plurality of unspecified viewers. In the third embodiment, a browsing state may not be known to other viewers by adding concealment attributes ("hidden" attributes) to the data of a browsing state of a virtual object described in the first embodiment. The concealment attributes ("hidden" attributes) are settings for preventing a browsing state from being known to other viewers by not displaying a user name or the like in a provision destination (for example, other viewer terminals) of information of the browsing state of the virtual object. An example of data of the browsing state in the third embodiment which is expressed in the JSON format will be described below.

```
{
  "session": {
    "sessionId": "111",
    "sessionName": "class 1",
    "users": [
      {
        "userId": "userA",
        "displayUserName": "user A",
        "hidden": true, // browsing state is not known to other viewers
        "anchors": [
          {
            "anchorId": "a",
            "anchorName": "cylinder A",
            "visible": true   // browsing virtual object
          }
        ]
      }
    ]
  }
}
```

Similarly to the first embodiment, the client terminal 133 which is a viewer terminal transmits a browsing state of a virtual object to the statistic server 121 according to change of the browsing state. In order to allow a viewer terminal to ascertain browsing states of other viewers, the browsing state acquiring unit 309 of the client terminal 133 can be allowed to acquire a browsing state of a virtual object from the browsing state providing unit 322. When the authority of a user who has logged in to the client terminal 133 is "viewer," the browsing state providing unit 322 does not return the browsing state of the user for whom "hidden" is true.

When the client terminal 133 which is a viewer terminal acquires and displays a browsing state of a virtual object, the same process as the process (FIG. 9) which is performed by an owner terminal is performed. That is, the anchor displaying unit 304 of the client terminal 133 acquires a browsing state of a shared virtual object from the statistic server 121. Then, as illustrated in FIG. 10, the anchor displaying unit 304 displays the browsing state of the shared virtual object 402 (the same as the virtual object 422) as a virtual object (the virtual object 1001 and the virtual object 1002).

An example of display of a browsing state of a virtual object when there is a viewer for whom the concealment attributes are valid will be described below. It is assumed that userA, userB, userC, userD, and the like share and view a virtual object correlated with the same anchor and the "hidden" attributes of only userA are valid ("hidden" is true). FIGS. 14A to 14C are diagrams illustrating an example of display of a browsing state of a virtual object according to the third embodiment.

FIG. 14A illustrates the client terminal 133 when userA has logged in thereto. FIG. 14B illustrates the client terminal 133 when userB has logged in thereto. FIG. 14C illustrates the client terminal 133 when userC has logged in thereto. Hatching of user names in virtual objects 1400 to 1402 indicates that they are user names of the corresponding users.

Regarding the virtual object 1400 which can be viewed by the client terminal 133 of userA, since the "hidden" attributes of only userA are valid ("hidden" is true), the browsing states of userB, userC, and the like can be ascertained therefrom. On the other hand, regarding the virtual object 1401 which is seen by the client terminal 133 of userB, since the concealment attributes of userA are valid ("hidden" is true), the browsing states of userA cannot be ascertained therefrom. Similarly, regarding the virtual object 1402 which is seen by the client terminal 133 of userC, since the concealment attributes of userA are valid ("hidden" is true), the browsing states of userA cannot be ascertained therefrom.

As described above, according to this embodiment, even a viewer terminal can display the browsing state of a shared virtual object. By adding the concealment attributes to data which is transmitted from the browsing state transmitting unit 308 to the browsing state receiving unit 321, a user who does not want to allow a browsing state thereof to be known can be made not to be displayed. Accordingly, by providing concealment attributes, a viewer terminal can ascertain a browsing state of a virtual object while respecting the intention of a user not wanting the browsing state to be known to others.

Fourth Embodiment

The anchor acquiring unit 303 of a viewer terminal acquires anchor information from the anchor providing unit 313 of the virtual object management server 111 normally, but a virtual object correlated with the anchor may not be displayed for some reasons. For example, when the camera 207 of the client terminal 133 which is a viewer terminal has an abnormality and a feature quantity in the real world cannot be ascertained well, when a feature quantity in the real world cannot be detected due to an imaging angle or the like, or the like, a virtual object cannot be displayed. Therefore, in a fourth embodiment, an owner terminal can be made to ascertain a viewer terminal in which the anchor acquiring unit 303 acquires an anchor from the virtual object management server 111 normally but a virtual object correlated with the anchor is not displayed. Since the owner can ascertain a viewer terminal having acquired a virtual object but not displaying the virtual object, the owner can perform support such that the viewer can appropriately view the virtual object.

The anchor managing unit 311 of the virtual object management server 111 manages provision of an anchor from the anchor providing unit 313 to a client terminal as an anchor acquisition state of the client terminal. Table 3 is an anchor acquisition state management table indicating the anchor acquisition states of client terminals.

TABLE 3

| Anchor ID | Session ID | User ID | Anchor acquisition date and time |
|---|---|---|---|
| a | 111 | userA | 2022/12/1 10:00:00 |
| a | 111 | userB | 2022/12/1 10:00:00 |
| a | 111 | userC | 2022/12/1 10:00:00 |
| a | 111 | userD | 2022/12/1 10:00:00 |
| . | . | . | . |
| . | . | . | . |
| . | . | . | . |

The anchor acquisition state management table includes, for example, an anchor ID, a session ID, a user ID, and an anchor acquisition date and time. The anchor ID column, the session ID column, and the user ID column are the same as described with reference to Table 1 and Table 2. The anchor acquisition date and time column indicate a date and time at which each user has acquired a target anchor. For example, Table 3 presents a state in which the anchor acquiring unit 303 of a client terminal to which each user has logged in acquires an anchor with an anchor ID of "a" from the anchor providing unit 313.

A state in which the anchor acquiring unit 303 of the client terminal 133 to which userD who is a viewer has logged in acquires the anchor with an anchor ID of "a" from the anchor providing unit 313 but a virtual object correlated with the anchor is not displayed will be described below as an example.

The browsing state managing unit 323 of the statistic server 121 acquires the anchor acquisition state of the client terminal in Table 3 from the anchor managing unit 311 of the virtual object management server 111. The process of acquiring the anchor acquisition state of the client terminal from the virtual object management server 111 which is performed by the browsing state managing unit 323 is periodically performed. The browsing state managing unit 323 compares the acquired anchor acquisition state of the client terminal with a browsing state of the virtual object based on information acquired from the browsing state transmitting unit 308 of the client terminals and stored in the browsing state managing unit 323. When the virtual object is appropriately displayed on each client terminal, the browsing state of the virtual object is transmitted from each client terminal to the statistic server 121. Accordingly, the user ID indicated by the anchor acquisition state matches the user ID included in the browsing state of the virtual object. On the other hand, when there is a client terminal in which the acquired virtual object is not displayed, the user ID corresponding to the user of the client terminal is included in the anchor acquisition state but is not included in the browsing state of the virtual object. Accordingly, the browsing state managing unit 323 can identify a viewer in which the virtual object is not displayed by comparing the anchor acquisition state of the client terminal 133 with the browsing states of the virtual object stored in the browsing state managing unit 323.

When a viewer in which the virtual object is not displayed is identified by the browsing state managing unit 323, the browsing states of the virtual object of the users are stored in the browsing state managing unit 323. An example of a browsing state of a virtual object to which information for identifying a non-display terminal stored in the browsing state managing unit 323 is added and which is expressed by data of a JSON format is described below.

```
{
  "session": {
    "sessionId": "111",
    "sessionName": "class 1",
    "users": [
      {
        "userId": "userA",
        "displayUserName": "user A",
        "anchors": [
          {
            "anchorId": "a",
            "anchorName": "cylinder A",
            "visible": true    // virtual object is viewed
          }
        ]
      },
      ...
      {
        "userId": "userD",
        "displayUserName": "user D",
        "anchors": [
          {
            "anchorId": "a",
            "anchorName": "cylinder A",
            "visible": false,   // virtual object is not viewed
            "missing": true      // predetermined time elapses after
anchor has been acquired
          }
        ]
      }
    ]
  }
}
```

Client terminals to which viewers of userA and userD have logged in acquire an anchor with an anchor ID of "a." The browsing state flag "visible" of userA who has viewed a virtual object correlated with the anchor is "true." On the other hand, the browsing state flag "visible" of userD who has not viewed the virtual object correlated with the anchor is "false." A "missing" attribute is allocated to userD who has not viewed the virtual object correlated with the anchor. That is, when the browsing state flag "visible" is "false," the "missing" attribute is allocated to the corresponding user. The "missing" attribute of "true" is an attribute that is allocated to a viewer who has not viewed the virtual object for a predetermined time. The time in which the virtual object has not been viewed is calculated on the basis of an anchor acquisition time included in the anchor acquisition states of the client terminals in Table 3 which the browsing state managing unit 323 periodically acquires from the anchor managing unit 311 and a current time.

The browsing state acquiring unit 309 of the client terminal 131 which is an owner terminal acquires a browsing state of a virtual object to which information for identifying a non-display terminal is added and which is expressed by data of the JSON format from the browsing state providing unit 322. The browsing state acquiring unit

309 of the client terminal 131 determines that the virtual object is not viewed on the client terminal 133 to which a viewer of userD has logged in because an attribute of "missing: true" is added to the browsing state of userD. The anchor displaying unit 304 of the client terminal 131 notifies the owner of the user who has not viewed the virtual object by displaying the user as a virtual object in the same way as in the browsing user displaying method according to the first embodiment.

As described above, according to this embodiment, an owner can ascertain a viewer having acquired anchor information but not browsing a virtual object by comparing an anchor acquisition state with browsing states transmitted from a client terminals.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-082653, filed May 19, 2022, which is hereby incorporated by reference wherein in its entirety.

What is claimed is:

1. A system that manages a virtual object, the system comprising:
   a memory storing instructions; and
   a processor executing the instructions causing the system to:
       detect whether the virtual object is actually viewed by a terminal;

acquire data associated with display of the virtual object in the terminal based on information which is provided from a service for managing a feature quantity in the real world for displaying the virtual object in association with the real world in correlation with identification information from one or more terminals, the data associated with display of the virtual object including data of browsing state of the virtual object in the terminal that is determined actually view the virtual object; and
       provide information on the virtual object acquired based on the acquired data.

2. The system according to claim 1, wherein the information on the virtual object indicates the number of users to whom the virtual object is displayed.

3. The system according to claim 1, wherein the information on the virtual object indicates names of users to whom the virtual object is displayed.

4. The system according to claim 1, wherein the processor provides information on the virtual object to an owner of the virtual object.

5. The system according to claim 1, wherein each terminal transmits data indicating that the virtual object is not to be displayed to the system when an application for displaying the virtual object ends.

6. The system according to claim 1, wherein when a login validity period of the user of the terminal has expired, the service transmits data indicating that the virtual object is not displayed on a terminal of the user to the system.

7. The system according to claim 1, wherein concealment attributes for not displaying a user name at a provision destination of information on the virtual object are able to be set in the data.

8. The system according to claim 1, wherein information on the virtual object indicates a name of a user to whom the virtual object corresponding to the information is not displayed while the information is provided by the service.

9. The system according to claim 1, wherein the terminal includes a head-mounted display.

10. The system according to claim 1, wherein the processor executing the instructions further causes the system to determine that the virtual object is viewed when the virtual object is disposed in the real world in the terminal.

11. The system according to claim 1, wherein the data of browsing state of the virtual object in the terminal is transmitted to a statistic server.

12. A method of controlling a system that manages a virtual object, the method comprising:
   detecting whether the virtual object is actually viewed by each terminal;
   acquiring data associated with display of the virtual object in the terminal based on information which is provided from a service for managing a feature quantity in the real world for displaying the virtual object in association with the real world in correlation with identification information from one or more terminals, the data associated with display of the virtual object including data of browsing state of the virtual object in the terminal that is determined to be viewed; and
   providing information on the virtual object acquired based on the acquired data.

* * * * *